(12) United States Patent
Kawatani et al.

(10) Patent No.: US 9,248,792 B2
(45) Date of Patent: Feb. 2, 2016

(54) POWER SUPPLY DEVICE FOR ELECTRIC VEHICLE

(71) Applicant: HONDA MOTOR CO., LTD., Tokyo (JP)

(72) Inventors: Shinji Kawatani, Wako (JP); Masaru Nakayama, Wako (JP); Isao Shokaku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 522 days.

(21) Appl. No.: 13/720,491

(22) Filed: Dec. 19, 2012

(65) Prior Publication Data

US 2013/0207460 A1    Aug. 15, 2013

(30) Foreign Application Priority Data

Feb. 9, 2012    (JP) .................................. 2012-026128

(51) Int. Cl.
*B60R 16/03*    (2006.01)
*B60L 11/18*    (2006.01)

(52) U.S. Cl.
CPC ............. *B60R 16/03* (2013.01); *B60L 11/1822* (2013.01); *B60L 11/1877* (2013.01); *B60L 11/1879* (2013.01); *B60L 2200/12* (2013.01); *Y02T 10/7005* (2013.01); *Y02T 10/705* (2013.01); *Y02T 10/7072* (2013.01); *Y02T 90/124* (2013.01); *Y02T 90/14* (2013.01)

(58) Field of Classification Search
CPC ............ B60L 11/1879; B60L 11/1822; B60L 11/1877; B60R 16/03; Y02T 90/124

USPC .......................................................... 307/9.1
See application file for complete search history.

(56) References Cited

U.S. PATENT DOCUMENTS 6,148,944 A * 11/2000 Adomi et al. ................. 180/220

FOREIGN PATENT DOCUMENTS

| EP | 686550 A1 * | 12/1995 |
| JP | 09-095291 A | 4/1997 |
| JP | 2003-231493 A | 8/2003 |
| TW | 2004-03172 A | 3/2004 |

* cited by examiner

*Primary Examiner* — Scott Bauer
(74) *Attorney, Agent, or Firm* — Birch, Stewart, Kolasch & Birch, LLP

(57) ABSTRACT

A battery pack locked to a vehicle body for mounting to and detaching from the vehicle body. A battery case is provided with an extension part extending to above a battery cell accommodating part. The extension part includes a handle including a grip part having an orientation set so as to extend in the vehicle longitudinal direction when the battery case is mounted on the vehicle. The handle is provided on the battery case in the state of being deviated toward either of vehicle-width-directionally left and right sides. A lock device attached to a main frame of the electric vehicle is provided with a lock pin that is advanced and retracted. The extension part on the battery case side is provided with an engagement hole for accepting the lock pin, the engagement hole being formed in either of side surface portions in the longitudinal direction of the electric vehicle.

20 Claims, 39 Drawing Sheets

POWER SUPPLY DEVICE FOR ELECTRIC VEHICLE

CROSS-REFERENCE TO RELATED APPLICATIONS

The present application claims priority under 35 USC 119 to Japanese Patent Application No. 2012-026128 filed Feb. 9, 2012 the entire contents of which are hereby incorporated by reference.

BACKGROUND OF THE INVENTION

1. Field of the Invention

The present invention relates to a power supply device for electric vehicle. More particularly, the invention relates to a power supply device for electric vehicle that is preferable for realizing an increased power supply capacity and an enhanced operability in mounting and detaching the power supply device to and from an electric vehicle, while securing a locking mechanism (lock mechanism).

2. Description of Background Art

Conventionally, in an electric vehicle, a battery pack having a plurality of battery cells assembled in a battery case are mounted as a power supply device. For instance, Japanese Patent Laid-open No. 2003-231493 describes a motorcycle wherein a battery pack is mounted on a battery holder attached to a vehicle body. More specifically, Japanese Patent Laid-open No. 2003-231493 describes a battery pack mounting structure and a lock mechanism wherein a groove part provided at an upper surface of the battery pack is provided with a hook part, and a mounting part fixed to a seat tube is provided with an engagement part for engagement with the hook part. The engagement part is movable inward and outward in the vertical direction. In the motorcycle described in Japanese Patent Laid-open No. 2003-231493, a handle to be utilized at the time of carrying the battery pack is provided at an upper portion of the battery pack so as to be located on the vehicle body rear side, or on the rear wheel side.

In the motorcycle described in Japanese Patent Laid-open No. 2003-231493, the handle provided on the battery pack is disposed in a narrow place between the mounting part projecting rearwardly from the seat tube and the rear wheel located just on the rear side of the battery pack. Therefore, there is little space around the handle. Accordingly, at the time of mounting or detaching the battery pack, a hand must be placed into and out of the narrow space between the mounting part and the rear wheel, which leads to poor operability.

In addition, the hook part to be engaged with the mounting part is provided on the battery pack body side, in other words, on the side of the battery case in which the battery cells are accommodated. Therefore, the volume for accommodating the battery cells is reduced, whereby battery capacity is limited.

SUMMARY AND OBJECTS OF THE INVENTION

It is an object of an embodiment of the present invention to provide a power supply device for electric vehicle which is preferable for realizing a substantial increase in the capacity of a battery pack and an enhanced operability in mounting and detaching the battery pack to and from a vehicle body, while securing a mechanism for locking the battery pack to the vehicle body, thereby solving the above-mentioned problems.

In order to attain the above object, according to an embodiment of the present invention, there is provided a power supply device that includes a battery case (20) for accommodating battery cells for supplying electric power to a traveling electric motor (21) of an electric vehicle (1) that can be mounted to and detached from the electric vehicle (1). The battery case (20) has an extension part (19P) extending to above a battery cell accommodating part. The extension part (19P) is provided with a handle (34) including a grip part (78) having an orientation set so as to extend in a vehicle longitudinal direction when the power supply device is mounted on the electric vehicle (1). An engagement part (62), for engagement with a movable part (323) of a lock device (32) attached to the electric vehicle (1), is formed at either of longitudinal-directionally side surfaces of the electric vehicle (1) in relation to the handle (34).

In addition, the power supply device according to an embodiment of the present invention provides the movable part (323) of the lock device (32) as a lock pin (323) advanced and retracted in the longitudinal direction of the electric vehicle (1) in relation to the lock device (32). In addition, the engagement part (62) is an engagement hole (62) for accepting the lock pin (323).

The power supply device according to an embodiment of the present invention provides the electric vehicle (1) with a main frame (3) of a monocoque type that has an upwardly curved shape and a pivot (5) by which a front end of a swing arm (7) is supported on the main frame (3). The electric motor (21) is disposed on a front side of the pivot (5) in the longitudinal direction of the electric vehicle (1) with a power drive unit (33) disposed on a further front side of the electric motor (21). The power supply device is disposed between the electric motor (21) and the power drive unit (33).

The power supply device according to an embodiment of the present invention provides the power supply device with a motor case (23) wherein the electric motor (21) is accommodated and is supported on the main frame (3). A terminal base (29) wherein a male-side terminal (63) is coupled to a female-side terminal (73) is disposed at a lower portion of the battery case (20). A battery pack cover (28) is provided with the terminal base (29) at a lower portion thereof and includes a space wherein the battery case (20) can be disposed at an upper portion of the terminal base (29). A battery pack support stay (27) is provided for connecting the battery cover (28) to the motor case (23).

The power supply device according to an embodiment of the present invention provides the extension part (19P) deviated toward either of the vehicle-width-directionally left and right sides in relation to the battery case (20) in a condition where the battery case (20) is mounted on the electric vehicle (1). At least an upper portion of the extension part (19P) is extended to such a position so as to overlap, in a side view of the vehicle, with that portion of the main frame (3) that is located above the battery case (20).

The power supply device according to an embodiment of the present invention includes a lock device support stay (30) that is joined to the main frame (3) and supports the lock device (32). The lock device support stay (30) has an extension part (30a) extending so as to be coupled to an upper portion of the battery pack cover (28).

The power supply device according to an embodiment of the present invention, includes the main frame (3) of the electric vehicle (1) with an under frame (105) extending downwardly to the front side of the battery pack cover (28). A skid plate (106) is attached to the under frame (105).

Furthermore, the power supply device according to an embodiment of the present invention includes a ring (621) as a reinforcement member that is fitted into an inner circumferential surface of the engagement hole (62).

According to an embodiment of the present invention, the extension part of the power supply device extending to above the battery cell accommodating part is provided with the handle having the grip part extending in the vehicle longitudinal direction. In addition, the handle is provided with the engagement part (engagement hole) for engagement with the movable part (lock pin) of the lock device. Therefore, the power supply device can be engaged with the lock device on the vehicle body side, to thereby achieve locking, without reducing the capacity of the battery cell accommodating part. In addition, since the engagement hole for engagement with the lock pin is provided at a side surface part of the handle so as not to interfere with the grip part, the battery pack is easy to handle.

According to an embodiment of the present invention, mass concentration in the electric vehicle can be achieved by a configuration wherein the electric motor is disposed on the front side of the swing arm pivoting part of the monocoque-type main frame, the power supply device is disposed on the front side of the electric motor, and the power drive unit (PDU) is disposed on the front side of the power supply device.

According to an embodiment of the present invention, the female-side terminals at a lower portion of the battery case and the male-side terminals provided on the terminal base at a lower portion inside the battery cover can be coupled to each other, by accommodating the battery case in the battery pack cover.

According to an embodiment of the present invention, the upper extension part of the battery case is deviated in the vehicle width direction, and the extension part extends to a position so as to overlap with the main frame of the vehicle body. Therefore, it is possible to secure a wide battery-accommodating space inside the battery case.

According to an embodiment of the present invention, the battery pack cover can be fixed not only at a lower portion thereof but also at an upper portion thereof, by coupling the battery pack cover to the main frame through utilizing the lock device support stay.

According to an embodiment of the present invention, the battery pack and the motor case can be protected by the skid plate from small stones, sand, etc. flying toward the battery pack and the motor case.

According to an embodiment of the present invention, the engagement hole for accepting the movable part of the lock device can be reinforced. Therefore, even when a lightweight material such as resin material is used for the member forming the engagement hole, namely, for the battery case, a high strength can be maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
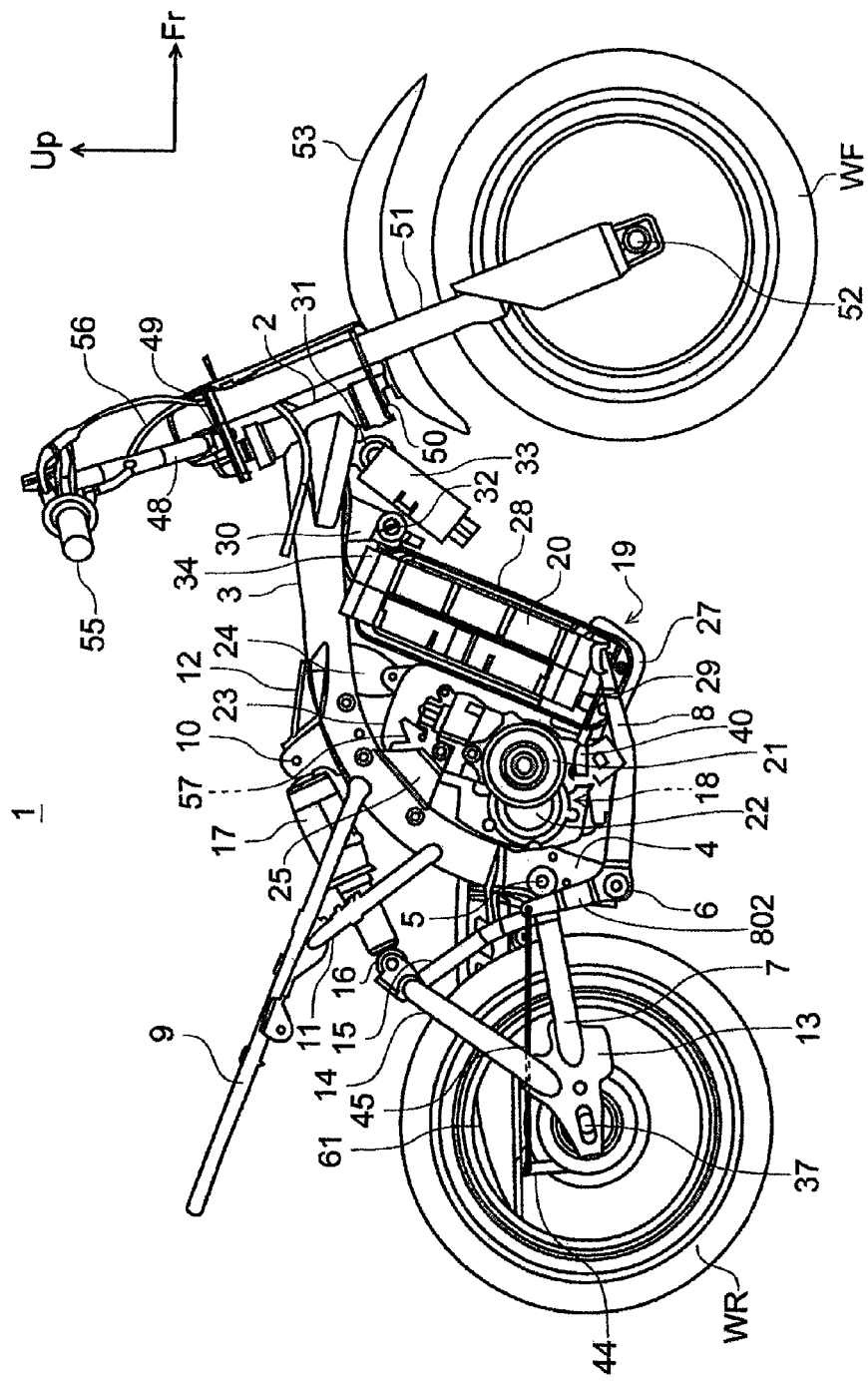
FIG. 1 is a right side view of an essential part of an electric vehicle provided with an electric vehicle control system according to an embodiment of the present invention.
Figure 2:
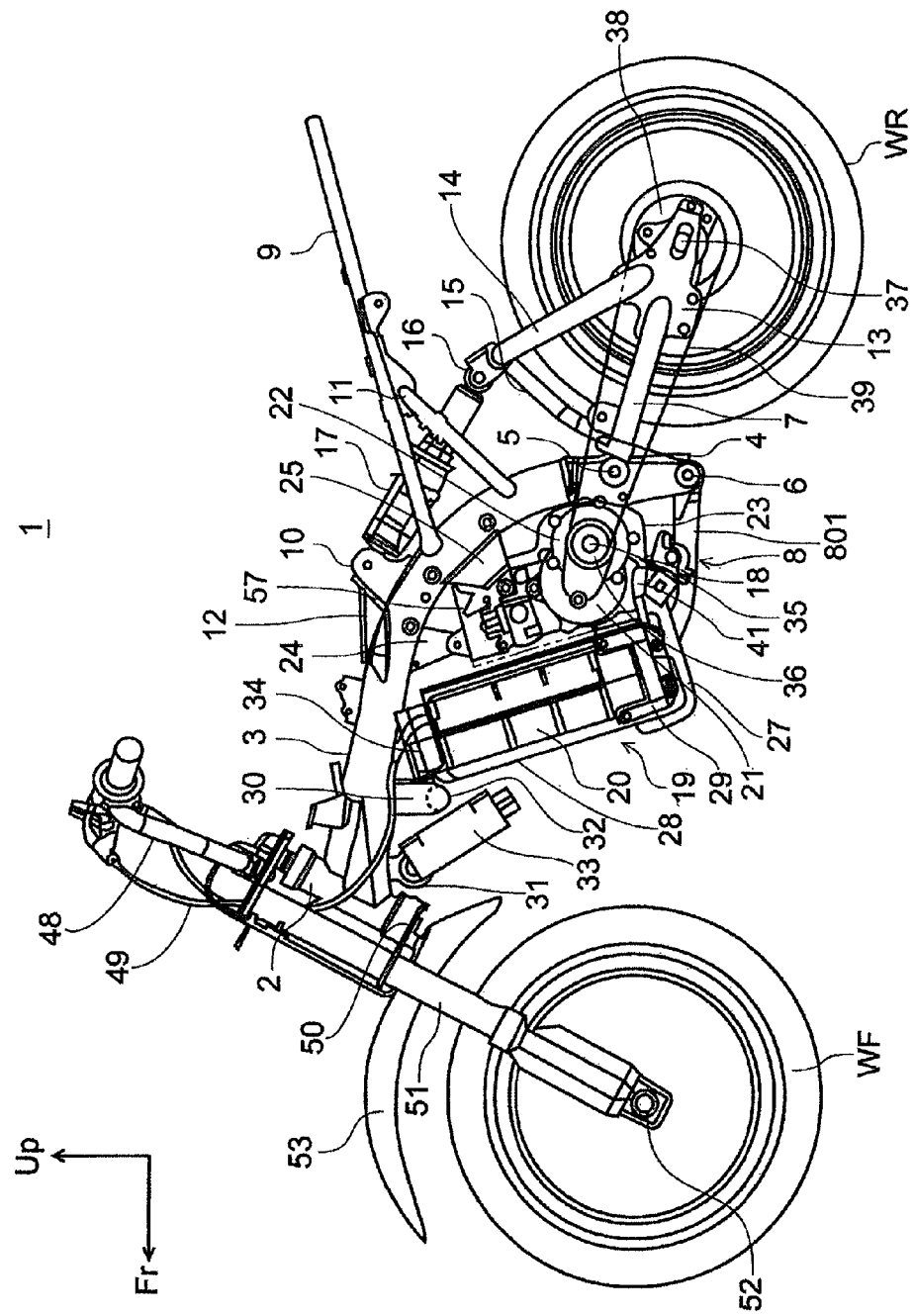
FIG. 2 is a left side view of an essential part of the electric vehicle provided with the electric vehicle control system according to the embodiment of the present invention.
Figure 3:
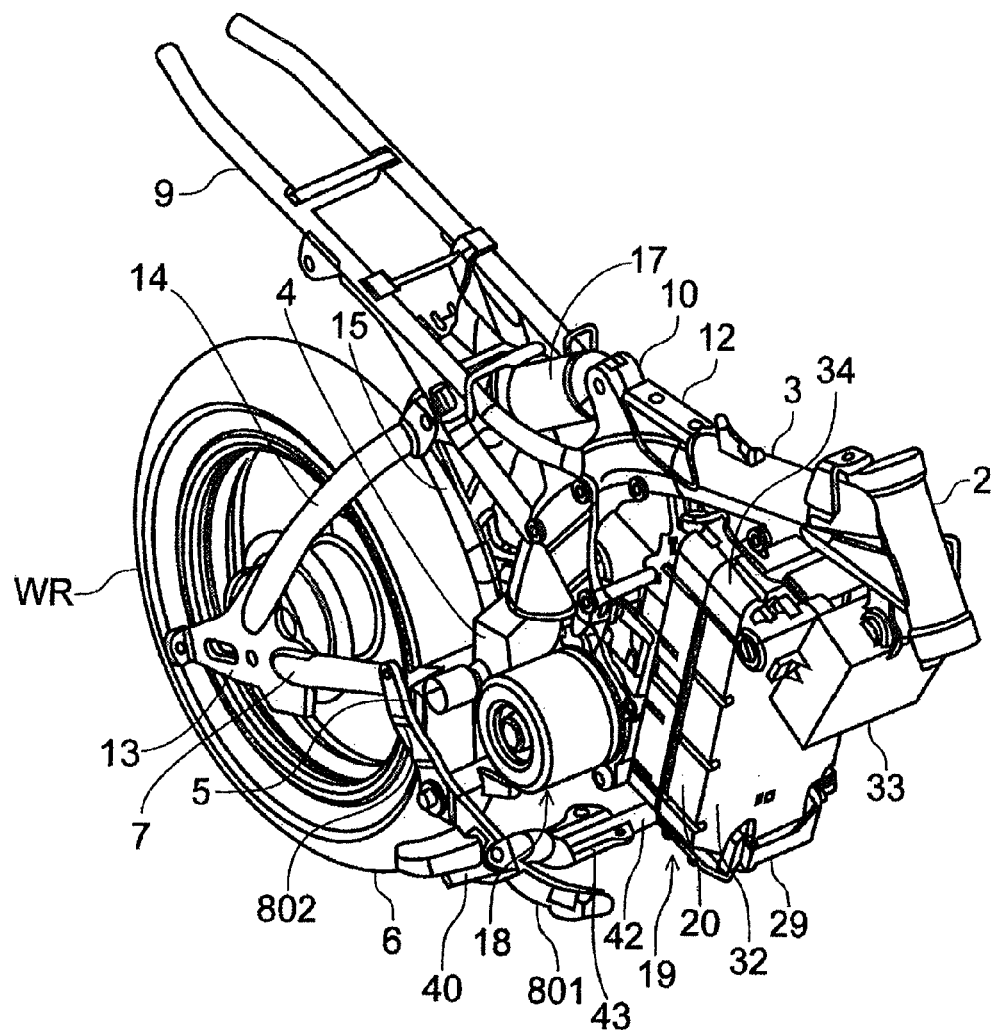
FIG. 3 is a perspective view of an essential part of the electric vehicle, as viewed from a right front side.

A preferred mode for carrying out the present invention will be described below, referring to the drawings. FIG. 1 is a right side view of an essential part of an electric vehicle provided with a power supply device for an electric vehicle according to an embodiment of the present invention. FIG. 2 is a left side view of the same. FIG. 3 is a perspective view of an essential part of the electric vehicle as viewed from a right front side. A rider seat and cowls and the like are omitted from the drawings, for easy understanding of the configuration of an essential part. In the drawings to be referred to in the following, the front side of the electric vehicle 1 will be denoted by symbol Fr, the rear side by symbol Rr, the left side by symbol L, the right side by symbol R, and the upper side by symbol Up. Unless especially defined, the directions (sides) herein are the directions (sides) with respect to the electric vehicle.

The electric vehicle 1 is a motorcycle of an off-road type wherein an electric motor is used as a drive source (hereafter, a description will be made wherein the "motorcycle" will be described as an "electric vehicle"). The motorcycle 1 has a main frame 3 that is joined to a head pipe 2 at a front end portion thereof and which extends downwardly and rearwardly. The main frame 3 has a monocoque body composed of an upwardly curved single pipe. The material of the main frame 3 is arbitrary, and the main frame 3 may be integrally molded with the head pipe 2.

To a lower rear portion of the main frame 3, pivot plates 4 are joined that are provided with a pivot 5 and a pivot 6 extending in the vehicle width direction. Of the pivot 5 and the pivot 6, the pivot 5 located on the upper side supports a pair of left and right swing arms 7 in a vertically swingable manner. The pivot 6 located below the pivot 5 supports a rear brake pedal 8 that is disposed on the right side of the electric motorcycle 1, in a vertically swingable manner. At a lower end portion of the pivot plate 4, a side stand (not shown) disposed on the left side of the electric motorcycle 1 can be pivotally supported.

A pair of left and right seat frames 9 and shock absorber front support brackets 10 are joined to a curved intermediate portion of the main frame 3. The shock absorber front support brackets 10 are reinforced with a stay 12. The seat frames 9 are joined to the main frame 3 at their front end portions, and extend toward the rear side of the vehicle body. Sub-frames 11 are provided that are each joined to the main frame 3 and the seat frame 9 at front and rear ends thereof. The seat frames 9 are supported from below and reinforced by the sub-frames 11.

Rear wheel support plates 13 are joined respectively to rear portions of the pair of left and right swing arms 7. Furthermore, rear end portions of a pair of left and right sub pipes 14 extending toward the front side of the vehicle body are joined to upper portions of the rear wheel support plates 13. Between the sub-pipe 14 and the swing arm 7, a connection tube 15 is provided that interconnects them. A shock absorber support rear bracket 16 is joined to an upper portion of the sub pipe 14. A shock absorber 17 is provided in the state of being pivotally supported by the shock absorber support front brackets 10 and the shock absorber support rear brackets 16. A rider seat (not shown) is mounted on a part ranging from the seat frames 9 and a front portion of the main frame 3.

A driving device 18 and a battery pack 19 as a power supply device located forwardly of the driving device 18 are provided on the main frame 3. The battery pack 19 includes a plurality of battery cells (not shown) accommodated in a battery case 20. The driving device 18 includes an electric motor 21 and a reduction gear 22, and is covered with a driving device case (hereafter referred to as "motor case") 23. In addition, since the driving device 18 is covered with the motor case 23, it should be drawn in broken lines. However, the driving device 18 is drawn in solid lines, for avoiding complexity and for better understanding of its shape. The motor case 23 is connected to hanger brackets 24 and 25 and a pivot plate 4, whereby it is suspended at three positions. The battery pack 19 includes a battery pack holding stay 27 connected to a lower portion of the motor case 23 and extending forward from the motor case 23, a battery pack cover 28 fixed to the battery pack holding stay 27 and a terminal base 29 fixed to a lower portion of the battery pack cover 28.

A lock device support stay 30 and a PDU bracket 31, that protrude downwardly, are joined to front portions of the main frame 3. A lock device 32 is mounted to the lock device support stay 30 located immediately forwardly of the battery pack 19. A PDU (power drive unit) 33 is mounted to the PDU bracket 31 located near the head pipe 2. The PDU 33 is supplied with electric power from the battery pack 19, and performs a digital phase control for the electric motor 21 in accordance with battery information (residual battery power, etc.), detection signals from various switches and sensors and the like provided on the motorcycle 1, etc.

A handle 34 to be used for carrying the battery pack 19 is provided at an upper portion located on the vehicle front side of the battery case 20 of the battery pack 19. The handle 34 is formed with a lock pin engagement part for engagement with a lock pin projecting from the lock device 32 (the lock pin and the lock pin engagement part will be detailed later).

A drive-side sprocket 36 is connected to an output shaft 35 of the reduction gear 22. A rear wheel WR as a drive wheel is supported on the rear wheel support plates 13 through a rear axle 37, and a driven-side sprocket 38 is connected to the rear axle 37. A drive chain 39 is arranged between the drive-side sprocket 36 and the driven-side sprocket 38, and power of the electric motor 21 reduced in speed by the reduction gear 22 is transmitted to the rear axle 37 through the driven-side sprocket 38. The drive chain 39 is accompanied by a chain cover 61 (see FIG. 1) covering an upper portion thereof. In addition, the rear axle 37 and the driven-side sprocket 38 are interconnected through a one-way clutch so that power of the electric motor 21 is transmitted to the rear wheel WR only in the direction for forward traveling of the motorcycle 1.

A step bar 42 extends in the vehicle width direction, and steps 40 and 41 on which to put the driver's feet are attached to the right and left ends of the step bar 42. The step bar 42 is attached to a bottom surface of the motor case 23 through a bracket 43. The rear brake pedal 8 supported on the pivot 6 includes a front arm part 801 operated by the driver's foot, and a rear arm part 802 that is connected through a brake cable 45 to an operation arm 44 of a rear brake (not shown) provided on the rear axle 37.

On the head pipe 2, a steering shaft (not shown) extends to penetrate the head pipe 2 along the vertical direction and is turnably supported. A pair of vertically extending front forks 51 are connected to a top bridge 49 and a bottom bridge 50 that are connected respectively to upper and lower portions of the steering shaft. A front axle 52 extending in the vehicle width direction is supported by the lower ends of the front forks 51, and a front wheel WF is rotatably supported on the front axle 52. A front fender 53 located on the upper side of the front wheel WF is mounted to the front forks 51.

A steering handle 48 supported on the top bridge 49 is provided with an accelerator grip 55. An accelerator cable 56 is connected to the accelerator grip 55. A turning amount of the accelerator grip 55 (accelerator position) is transmitted through the accelerator cable 56 to an accelerator position sensor (APS) 57 provided inside the motor case 23.

Figure 4:
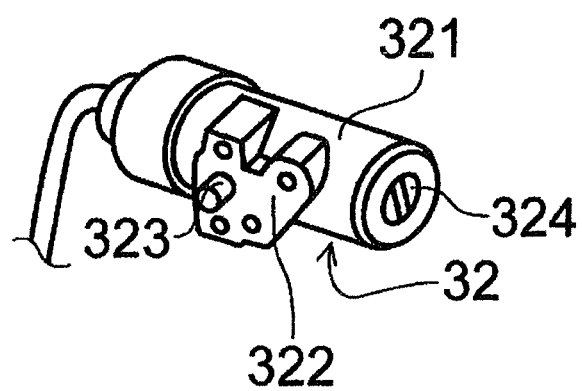
FIG. 4 is a perspective view of a lock device, as viewed from a right upper side of the vehicle body.
Figure 5:
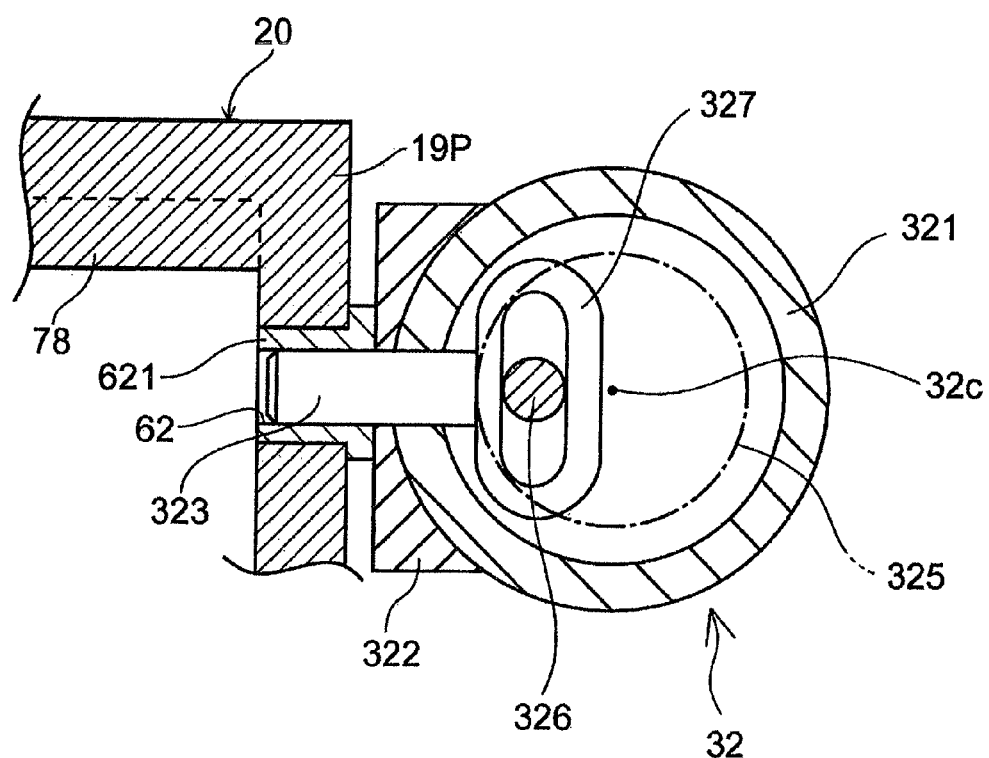
FIG. 5 is a sectional view showing a section passing through a lock pin of the lock device, as viewed from the right side of the vehicle body.

FIG. 4 is a perspective view of the lock device 32 as viewed from a right upper rear side of the vehicle body. FIG. 5 is a sectional view showing a section passing through the lock pin of the lock device 32, as viewed from the right side of the vehicle body. The lock device 32 includes a cylinder part 321 having a hollow cylindrical shape, a lock pin guide 322 projecting to a side portion (on the rear side of the vehicle body) of the cylinder part 321, and a lock pin 323 as a movable part extending in a direction orthogonal to the cylinder part 321 while penetrating the lock pin guide 322.

The cylinder part 321 is formed in its right end portion with a key hole 324, and a key (not shown) is inserted in the key hole 324. A configuration in conjunction with the turning direction of the key is adopted wherein when the key is turned in a power supply turning-ON direction (for example, clockwise), the lock pin 323 is protruded from the cylinder part 321, and when the key is turned to a power supply turning-OFF side, the lock pin 323 is retracted to the cylinder part 321 side.

A mechanism for conversion of the rotating motion of the key into a forward-rearwardly motion of the lock pin 323 includes an inner tube disk 325 provided coaxially with the cylinder part 321, as shown in FIG. 5. In this mechanism, an eccentric shaft 326 provided on the inner tube disk 325 is engaged with an end portion (an annular portion protruding into the inside of the cylinder) 327 of the lock pin 323, whereby the lock pin 323 can be extended and retracted according to the eccentricity amount of the eccentric shaft 326 relative to the rotational center 32c of the inner tube disk 325. The lock device 32 is mounted to the lock device support stay 30, with such a positioning that the lock pin 323 being extended is loosely fitted in an engagement hole 62 formed in the battery case 20. The advancing-and-retracting mechanism for the lock pin 323 is not restricted to the one having the structure shown in FIG. 5, and can be replaced by other known one.

The battery case 20 is preferably formed from a resin, from the viewpoint of lighter weight and easier production. For reinforcing the engagement hole 62, therefore, a reinforcement ring 621 made of metal, for example, may be fitted in the inner circumference of the engagement hole 62.

Figure 6:
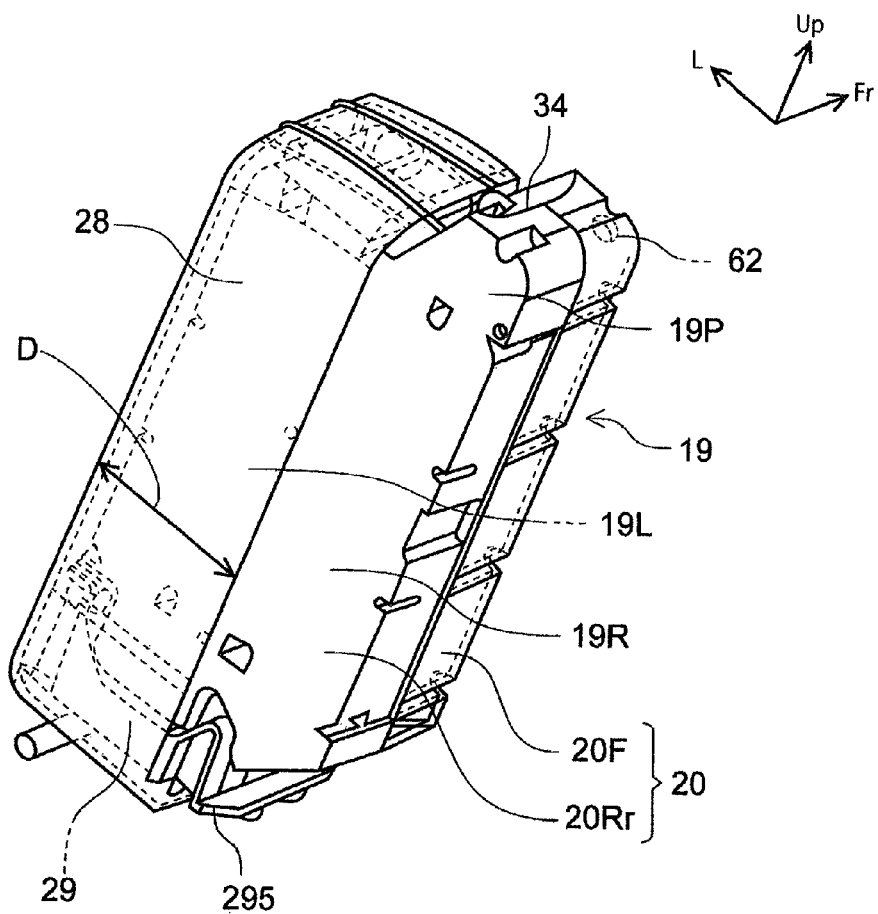
FIG. 6 is a perspective view of a battery pack accommodated in a battery pack cover, as viewed from a right upper rear side of the vehicle body.

FIG. 6 is a perspective view of the battery pack 19 accommodated in the battery pack cover 28, as viewed from a right upper rear side of the motorcycle 1. The battery pack cover 28 has a shape as if obtained by removal of one surface (a surface on the right side of the vehicle body) of six surfaces constituting a substantially rectangular parallelpiped shape. A depth D (the dimension in the left-right direction of the vehicle body) of the battery pack cover 28 is set so that the battery pack cover 28 covers only roughly a half 19L, located on the left side of the vehicle body, of the battery pack 19. Therefore, roughly a half 19R, on the right side of the vehicle body, of the battery pack 19 is not covered by the battery pack cover 28, so that the right-side external appearance of the battery pack 19 can be visually confirmed externally.

The terminal base 29 is fixed to a bottom portion of the battery pack cover 28. The terminal base 29 is provided with a battery pack support part 295 that is engaged with a front-rear surface lower portion on the battery pack 19 side at a right-side portion of the battery pack 19, namely, at its right half 19R not covered with the battery pack cover 28.

An upper portion of the right half 19R of the battery pack 19 extends to the upper side relative to an upper end portion of the battery pack cover 28. This upper-side extension part 19P is provided with a recess that is recessed to the right side from a part on the vehicle body left side. An upper wall forming the recess constitutes a grip part of the handle 34 to be hooked by finger tips. The recess and the grip part constituting the upper wall of the recess will be described later, referring to FIGS. 10 and 13, etc.

The battery case 20 of the battery pack 19 is composed of a front part 20F and a rear part 201Zr into which the battery case 20 is bisected in the vehicle longitudinal direction. A front side surface of the front part 20F constituting the upper-side extension part 19P is formed with the engagement hole 62 in which the lock pin 323 protruding from the lock device 32 is to be loosely fitted. The engagement hole 62 is bored in a wall surface of the front part 20F, which is orthogonal to the grip part (described later) of the handle 34, of the battery case 20.

Figure 7:
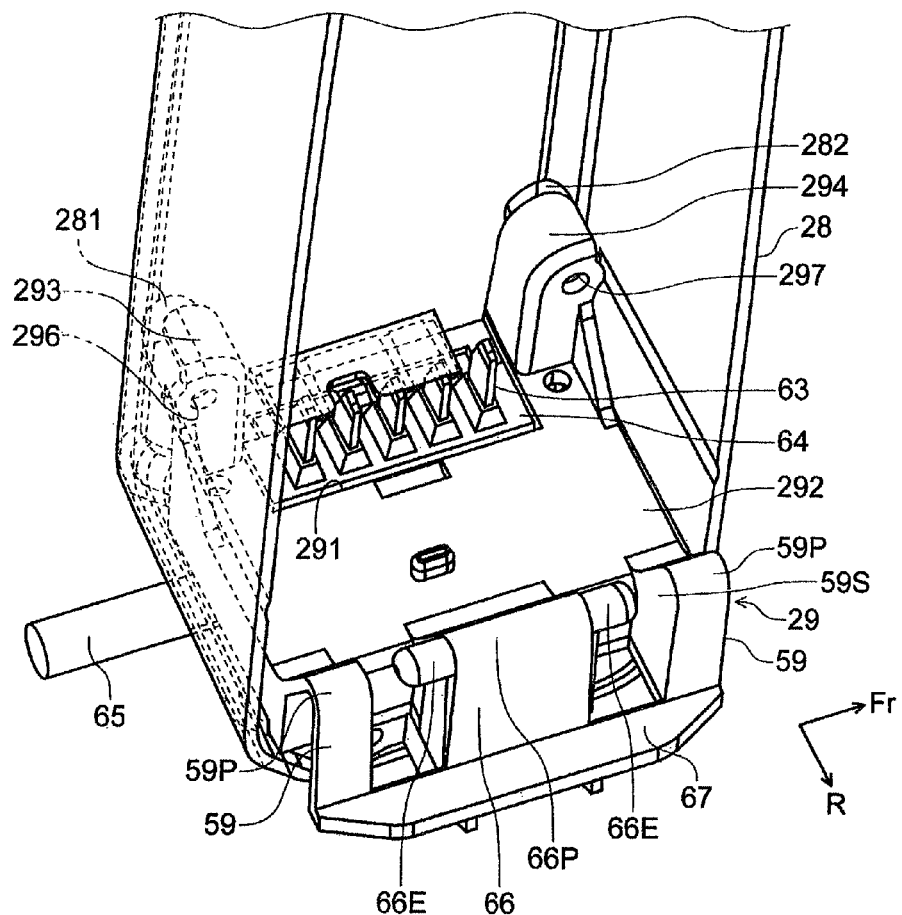
FIG. 7 is a perspective view of a terminal base fixed to the battery pack cover, as viewed from a right upper rear side of the vehicle body.
Figure 8:
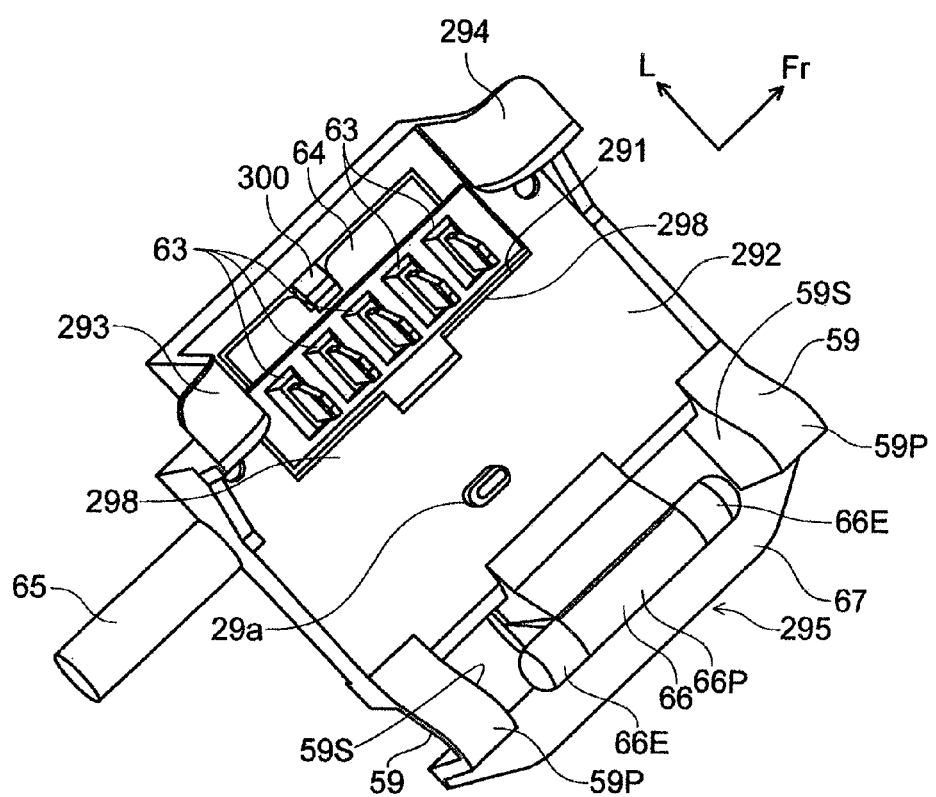
FIG. 8 is a perspective view of the terminal base with an insulator board fitted therein, as viewed from a right upper rear side of the vehicle body.
Figure 9:
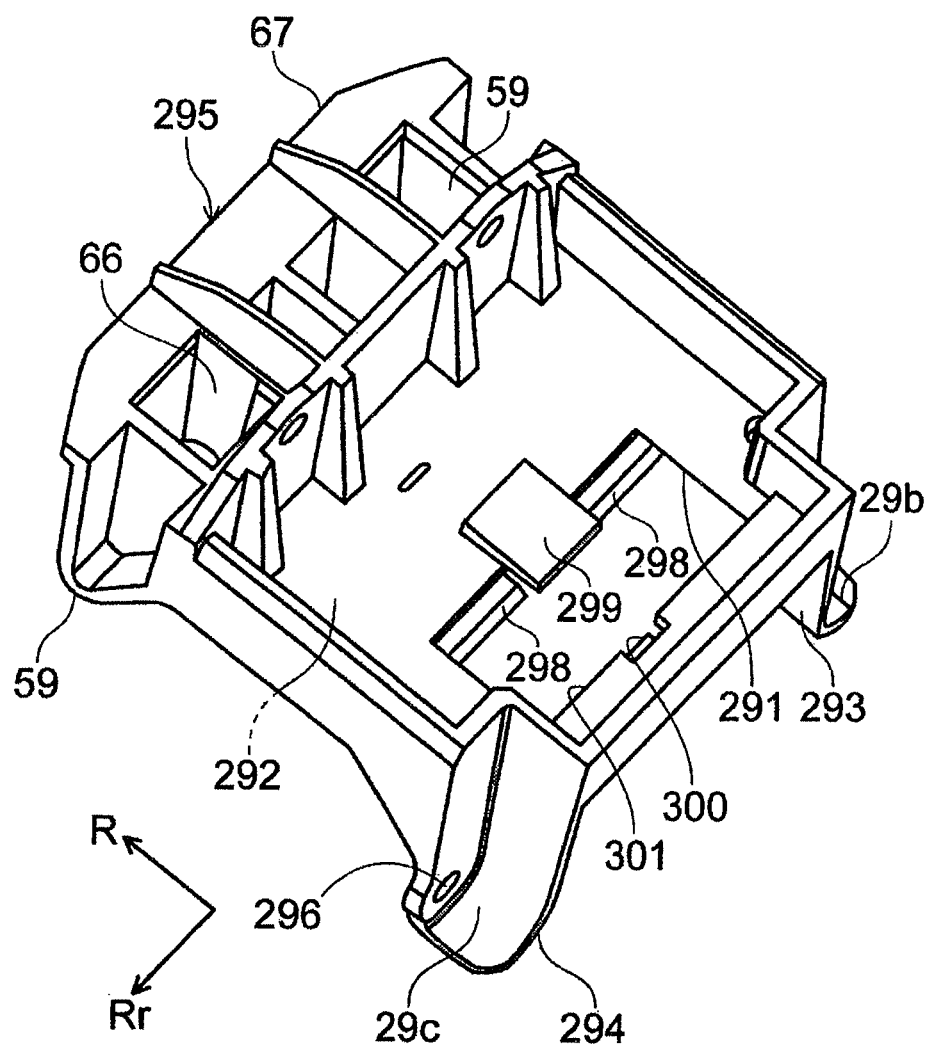
FIG. 9 is a perspective view of the terminal base, as viewed from a left lower rear side of the vehicle body.

FIG. 7 is a perspective view of the terminal base 29 fixed to the battery pack cover 28, FIG. 8 is a perspective view of the terminal base 29 with an insulator board 64 fitted therein, as viewed from a right upper rear side of the vehicle body, and FIG. 9 is a perspective view of the terminal base 29 as viewed from a left lower rear side of the vehicle body. The terminal base 29 includes a base 292 provided with an opening 291 into which to fit the insulator board 64 having mounted thereto a plurality of male-side terminals 63 arrayed in a row along the vehicle longitudinal direction; mounting parts 293 and 294 protruding to the upper side of the base 292 and distributed in the vehicle longitudinal direction at a vehicle body left-side end portion and a battery pack support part 295 extending to the vehicle body right side in relation to the base 292. Between the opening 291 and the battery pack support part 295, a projected part 29a for engagement with a bottom surface of the battery case 20 is formed on the base 292.

The mounting parts 293 and 294 are provided with inner circumferential surfaces 29b and 29c (see FIG. 9) to be located over bosses 281 and 282 formed at a vehicle body left side surface of the battery pack cover 28. The mounting parts 293 and 294 are formed with bolt passing holes 296 and 297 bored in the vehicle width direction. When bolts or setscrews (not shown) which can be passed through the bolt holes 296 and 297 from the vehicle body right side are screw engaged with screw holes (not shown) formed in the bosses 281 and 282 protruding from the battery pack cover 28, the terminal base 29 can be fixed to the battery pack cover 28.

On vehicle-longitudinal-directionally both sides of a vehicle body right-side edge of the opening 291, upper guides 298, 298 protrude along the upper surface of the base 292. In addition, the vehicle body right-side edge of the opening 291 is provided with a lower guide 299 protruding along the lower surface of the base 292 between the upper guides 298, 298. On the other hand, on vehicle-longitudinal-directionally both sides of a vehicle body left-side edge of the opening 291, a lower guide 301 is protruded along the lower surface of the base 292. Further, at a vehicle-longitudinal-directionally central portion of the vehicle body left-side edge of the opening 291, a stopper 300 projects from the upper surface of the base 292.

A harness 65 led out to the driving device 18 side is connected to the male-side terminals 63. In the case of mounting the insulator board 64 to the base 292, the harness 65 is passed through the opening 291 from the upper side of the base 292 of the terminal base 29 to the lower side of the base 292. Then, while clamping one edge (the edge on the vehicle body right side) of the insulator board 64 between the upper guides 298, 298 and the lower guide 299, the lower surface of another edge (the edge on the vehicle body left side) of the insulator board 64 is brought into contact with the lower guide 301, and the stopper 300 is engaged with the upper surface and thereby fixed.

The battery support part 295 is provided with two end engagement projections 59, 59 aligned in the vehicle longitudinal direction, and with a central engagement projection 66 located between the end engagement projections 59, 59. The central engagement projection 66 is provided with a peak portion 66P including a cylindrical stopper 66E protruding to the sides of the end engagement projections 59, 59 and engaged with the battery case 20 as will be described later. In spaces formed between the end engagement projections 59, 59 and the central engagement projection 66, ribs (described later) formed on a bottom portion of the battery case 20 are to be inserted.

The upper portion shapes of the peak portions 59P and 66P of the end engagement projections 59, 59 and the central engagement projection 66 are the same part-of-circle shape, and they are aligned in the front-rear direction of the battery pack 19. Vehicle body right-side foot portions of the end engagement projections 59, 59 and the central engagement projection 66 form a shelf 67, whereby the end engagement projections 59, 59 and the central engagement projection 66 are interconnected at their lower portions. As will be described later, the shelf 67 provides a base on which the battery pack 19 can be tentatively put at the time of mounting or detaching the battery pack 19 to or from the battery pack cover 28.

Figure 10:
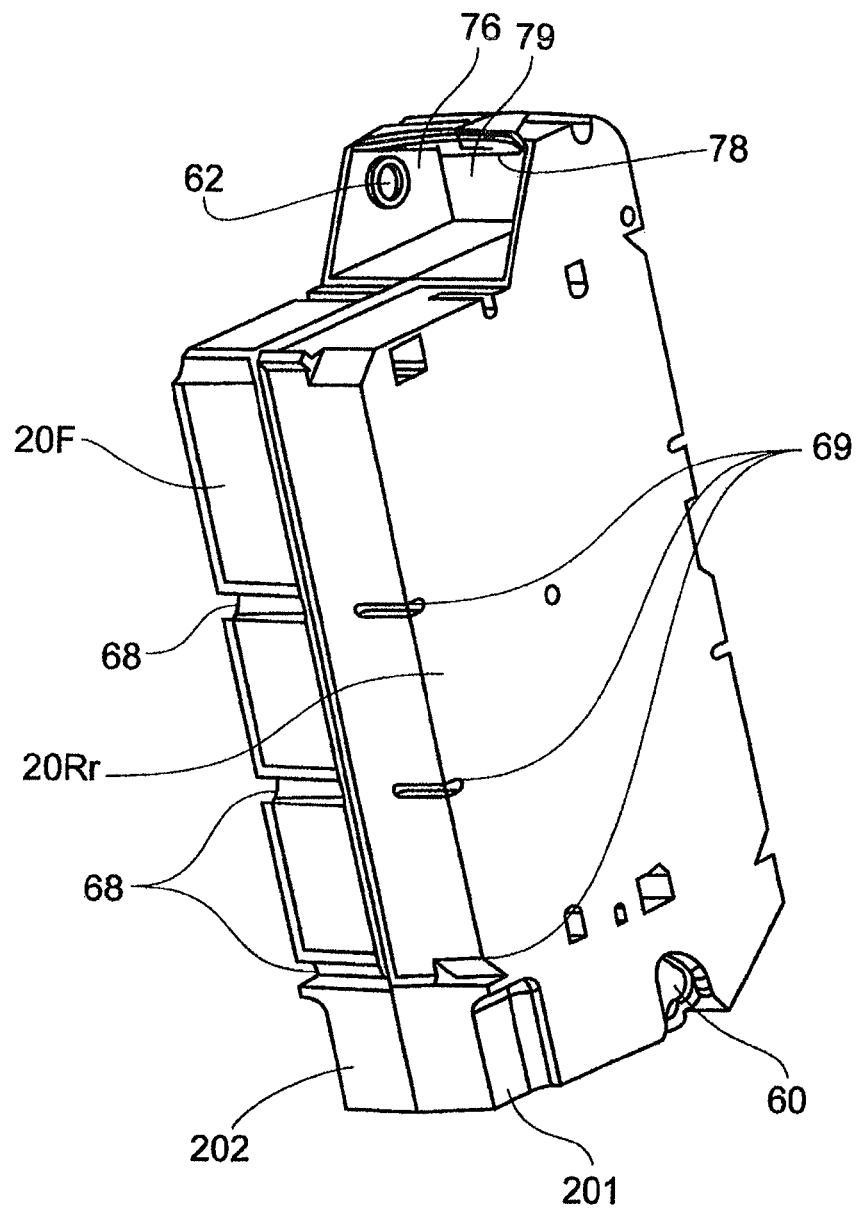
FIG. 10 is a perspective view of the battery pack, as viewed from a left upper rear side of the vehicle body.
Figure 11:
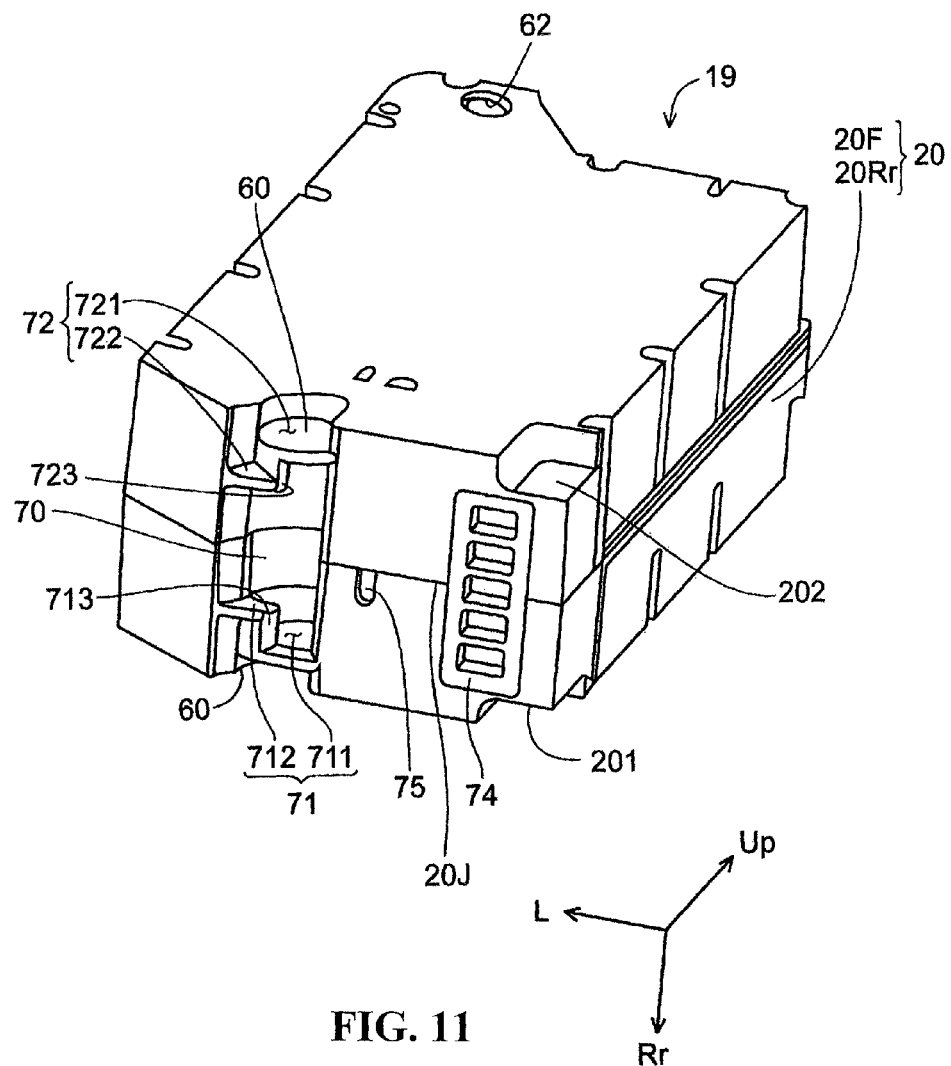
FIG. 11 is a perspective view of the battery pack, as viewed from a left lower front side of the vehicle body.

FIG. 10 is a perspective view of the battery pack 19 as viewed from a left upper rear side of the vehicle body, and FIG. 11 is a perspective view of the battery pack 19 as viewed from a left lower front side of the vehicle body. In FIGS. 10 and 11, the front part 20F and the rear part 20Rr of the battery case 20 are coupled to each other by bolts or setscrews, to form the battery case 20 as a sealed casing.

At a circumferential edge of a side surface (a surface located on the vehicle body front side when the battery pack 19 is mounted on the vehicle) of the front part 20F of the battery case 20, notches 68 as relief portions for passing bolts or setscrew therethrough are formed in a plurality of positions. In addition, at a circumferential edge of the rear part 29Rr corresponding to the notches 68, screw holes 90 (described later referring to FIG. 13) with which the bolts or setscrews passed from the front part 29F side are to be screw engaged are formed. In order not to elongate the screw holes 90 more than necessary, notches 69 are formed at the circumference of the rear part 20Rr. The screw holes are formed in the part near the front part 20F exclusive of the notches 69.

Lower corner parts 201 and 202 of the battery case 20 are recesses which are cut out so as to avoid the mounting parts 293 and 294 formed on the terminal base 29. In addition, at lower side surfaces (surfaces located on the vehicle body left and right sides when the battery pack 19 is mounted on the vehicle) of the battery case 20, end engagement recesses 60 are formed that are adapted to the end engagement projections 59, 59 of the battery support part 295 and a central engagement recess 70 is formed that is adapted to the central engagement projection 66 of the battery support part 295. The end engagement recesses 60 and the central engagement recess 70 are partitioned by ribs 71 and 72 projecting from a bottom portion of the battery case 20. The ribs 71 and 72 are parallel to joint surfaces 20J of the front part 20F and the rear part 20Rr of the battery case 20. The ribs 71 and 72 each have two parts 711 and 712, and 721 and 722 which are bent to the direction orthogonal to the joint surfaces 20J at an intermediate position in the vehicle width direction, thereby forming a step.

Of the parts 711 and 712 of the rib 71 and the parts 721 and 722 of the rib 72, those parts 711 and 721 which are located on the outer side make contact with the inside surfaces of the end engagement projections 59, 59. On the other hand, those parts 712 and 722 which are located on the inner side make contact with a downwardly extending outside portion of the peak portion 66P of the central engagement projection 66, and function as a guide in the vehicle longitudinal direction for the battery pack 19 in relation to the terminal base 292. A link part 713 linking the parts 711 and 712 of the rib 71 to each other and a link part 723 linking the parts 721 and 722 to each other are provided. The link parts 713 and 723 are each arc-shaped in side view of the battery pack 19, and their inner circumferential surfaces (surfaces located near the upper side of the battery pack 19) are engaged with the stopper 66E of the central engagement projection 66 at a position where the battery pack 19 is mounted on the terminal base 29.

To a bottom portion of the battery case 20, an insulator block 74 is mounted. The insulator block 74 is provided with female-side terminals 73 (described later referring to FIGS. 24 to 26, etc.) into which to insert the male-side terminals 63 attached to the terminal base 29. The insulator block 74 is held between the front part 20F and the rear part 20Rr of the battery case 20, without using any fastening member such as bolts or setscrews. The mode of holding will be described later. The front part 20F of the battery case 20 is provided in its bottom portion with a cutout 75 into which to fit the projected part 29a formed on the terminal base 292.

Figure 12:
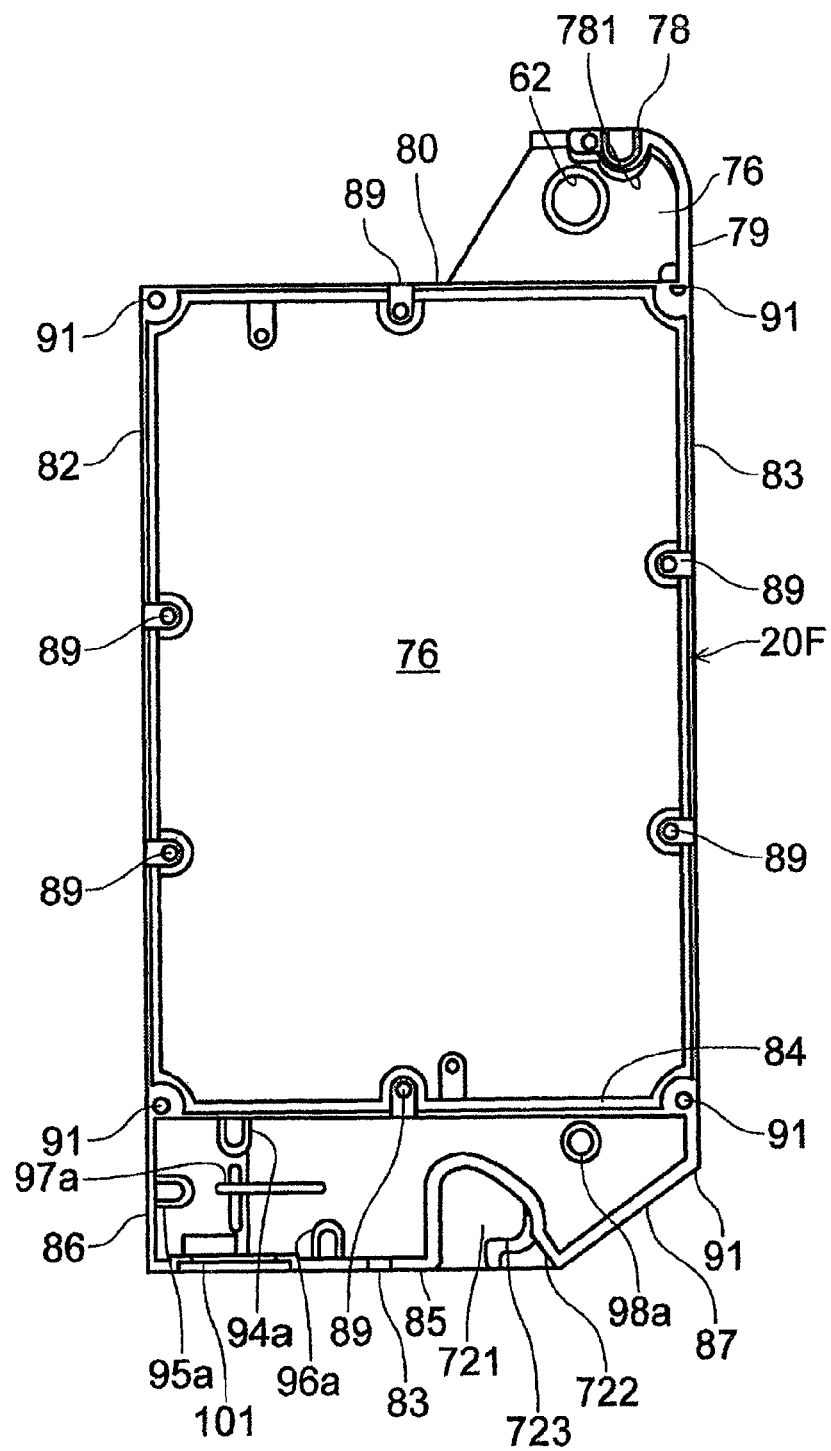
FIG. 12 is a plan view of a front part of a battery case, as viewed from a vehicle-width-directional center side.
Figure 13:
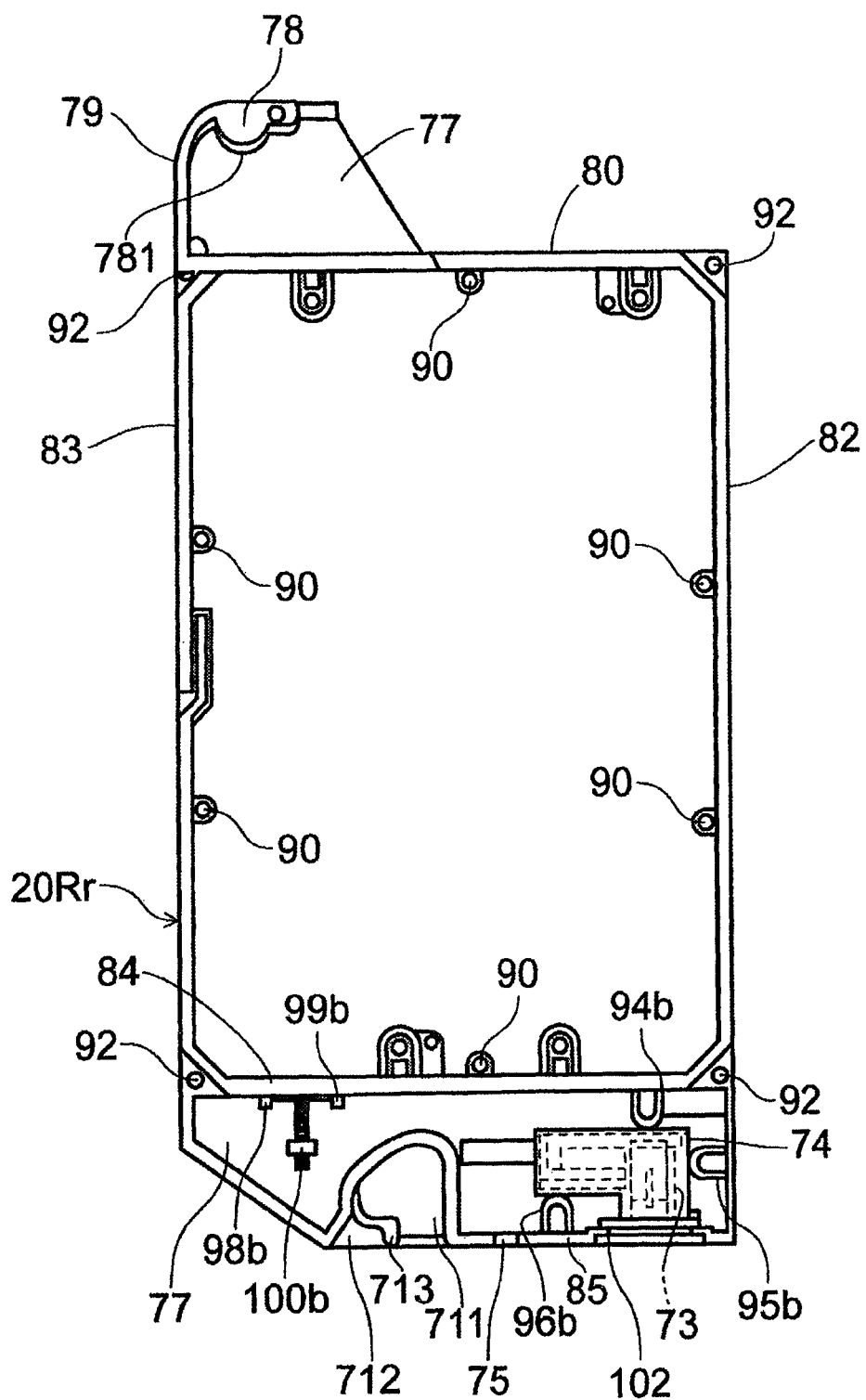
FIG. 13 is a plan view of a rear part of the battery case, as viewed from the vehicle-width-directional center side.
Figure 14:
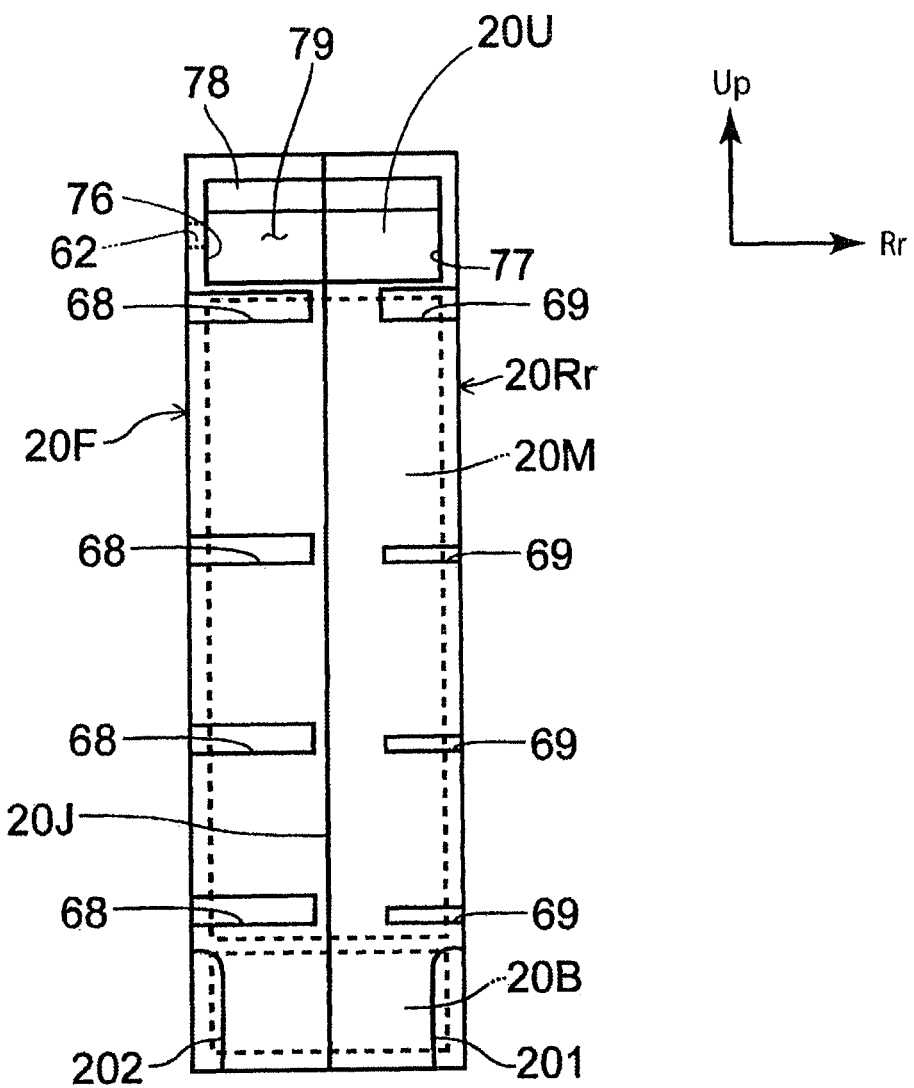
FIG. 14 is a view of the battery case, as viewed from the left side of the vehicle body.

FIG. 12 is a plan view of the front part 20F of the battery case 20, as viewed from a vehicle-width-directional center side, FIG. 13 is a plan view of the rear part 20Rr of the battery case 20, as viewed from the vehicle-width-directional center side, and FIG. 14 is a view of the battery case as viewed from the left side of the vehicle body. The front part 20F and the rear part 20Rr of the battery case 20 form an upper chamber 20U, a middle chamber 20M and a bottom chamber B (see FIG. 14) when combined with each other. In addition, FIG. 13 shows a condition where the insulator block 74 with the female-side terminals 73 accommodated therein is held in the bottom chamber 20B.

The upper chamber 20U is formed as a recess which is surrounded by a front wall 76 and a rear wall 77, an upper wall 78 constituting the grip part of the handle 34, a vertical wall 79 extending downward from the upper wall 78, and an upper wall 80 of the middle chamber 20M, and which is opened on one side (the vehicle-width-directionally left side). The grip part, or the upper wall 78, has a part-of-cylinder shaped projection 781 which extends in the front-rear direction of the battery pack 19 (substantially in the same direction as the vehicle longitudinal direction), on which the operator's fingers are to be hooked, and which is bulged to the lower side. The engagement hole 62 in which to fit the lock pin is formed in the front wall 76, orthogonal to the grip part 78, of the front part 20F at a position deviated from the grip part 78.

The middle chamber 20M is a chamber in which to accommodate a plurality of battery cells (not shown). The middle chamber 20M is surrounded by the front wall 76 and the rear wall 77, the upper wall 80, left and right walls 82 and 83, and a bottom wall (common with an upper wall of the bottom chamber 20B) 84.

The bottom chamber 20B is surrounded by the front wall 76 and the rear wall 77, the upper wall (common with the bottom wall of the middle chamber 20M) 84, a bottom wall 85, a left wall 86 and a right wall 87. The bottom chamber 20B is a chamber in which to accommodate the female-side terminals 73, the insulator block 74, and a fuse 88. The fuse 88 will be described later, referring to FIG. 17.

The front part 20F of the battery case 20 is provided with screw passing holes 89 through which bolts or setscrews can be passed. The rear part 20Rr of the battery case 20 is formed with screw holes 90 at positions corresponding to the screw passing holes 89. In addition, pins 91 for positioning are erected on either one (here, the front part 20F) of the front part 20F and the rear part 20Rr of the battery case 20, and the other (here, the rear part 20Rr) is formed with pin holes 92 in which to fit the pins 91.

In relation to the walls 80, 82, 83 and 84 forming the middle chamber 20M, it is recommendable to dispose a packing or seal at the joint surfaces 20J of the front part 20F and the rear part 20Rr.

The front part 20F of the battery case 20 forming the bottom chamber 20B is provided with a rib 94a projecting from the upper wall 84 into the bottom chamber 20B; a rib 95a projecting from the left wall 86 into the bottom chamber 20B; a rib 96a projecting from the bottom wall 85 into the bottom chamber 20B and a rib 97a projecting from the front wall 76 into the bottom chamber 20B.

On the other hand, the rear part 20Rr of the battery case 20 which forms the bottom chamber 20B is provided with a rib 94b projecting from the upper wall 84 into the bottom chamber 20B; a rib 95b projecting from the left wall 86 into the bottom chamber 20B; a rib 96b projecting from the bottom wall 85 into the bottom chamber 20B and a rib 97b projecting from the rear wall 77 into the bottom chamber 20B. The ribs 95a and 95b, the ribs 96a and 96b, and the ribs 97a and 97b, are set at such positions as to be opposed to each other in the condition where the front part 20F and the rear part 20Rr are combined with each other. In addition, these ribs cooperate with each other in holding the female-side terminals 73 and the insulator block 74 (described later).

Furthermore, the front part 20F of the battery case 20 which forms the bottom chamber 20B is formed with a boss 98a projecting from the front wall 76. On the other hand, the rear part 20Rr of the battery case 20 is provided with ribs 98b, 99b, and 100b which project into the bottom chamber 20B from the upper wall 84 and the rear wall 77 forming the bottom chamber 20B. The ribs 98b, 99b and 100b cooperate with the boss 98B in holding a fuse 99 (described later) in the condition where the front part 20F and the rear part 20Rr are combined with each other.

The front part 20F and the rear part 20Rr of the battery case 20 forming the bottom wall 85 of the bottom chamber 20B are formed respectively with cutouts 101 and 102 for receiving an end portion of the insulator block 74. When the front part 20F and the rear part 20Rr are combined with each other, the cutouts 101 and 102 form a substantially rectangular opening 103 (see FIG. 15) in which to receive and hold an end portion of the insulator block 74.

Figure 15:
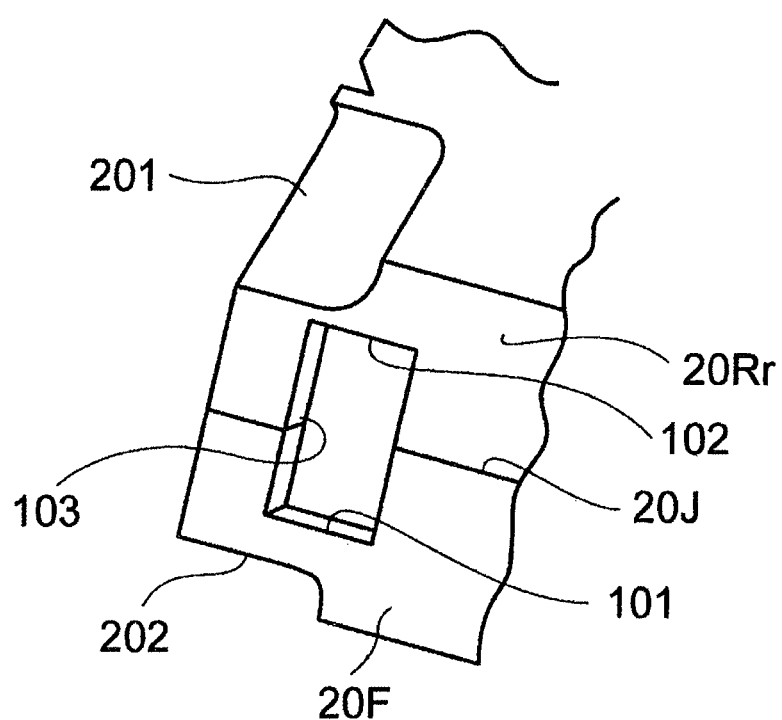
FIG. 15 is an enlarged perspective view of an essential part of the battery case.

FIG. 15 is an enlarged view of an essential part of the battery case 20. As shown in FIG. 15, the cutouts 101 and 102 formed respectively in the joint surfaces 20J of the front part 20F and the rear part 20Rr form the opening 103 in a bottom portion of the battery case 20.

Figure 16:
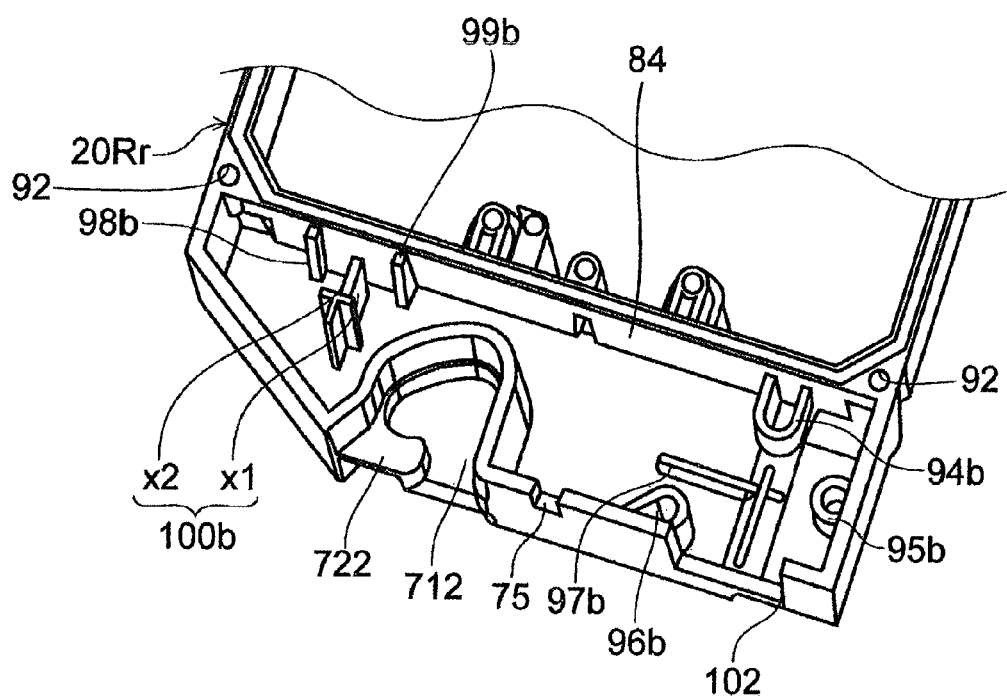
FIG. 16 is a perspective view of a part of the battery case, as viewed from a left lower front side.
Figure 17:
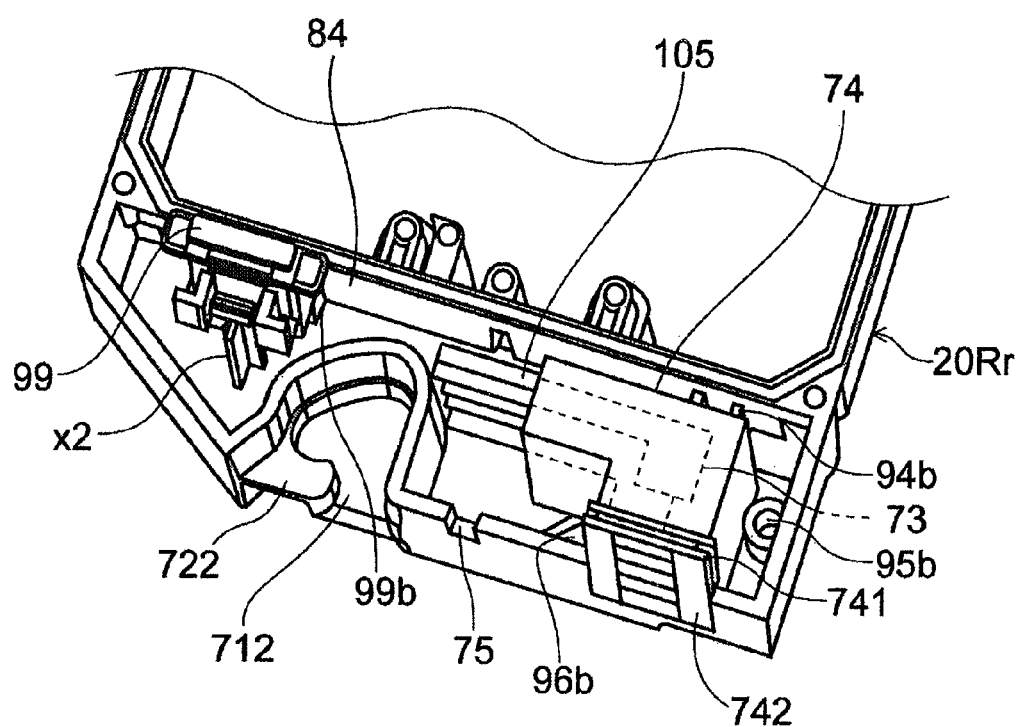
FIG. 17 is a perspective view of a part in a condition where a fuse and a female-side terminal and an insulator block are mounted, as viewed from a left lower front side.

FIG. 16 is an enlarged perspective view of a lower portion of the rear part 20Rr of the battery case 20, and FIG. 17 is an enlarged perspective view of a lower portion of the rear part 20Rr in the condition where the fuse 99 and the male-side terminals 73 and the insulator block 74 are mounted in position. As understood from FIG. 16, the ribs 94b, 95b and 96b are each in a part-of-cylinder shape, whereas the rib 97b is cross-shaped as viewed in the vehicle longitudinal direction in the condition where the battery case 20 is mounted to the vehicle body.

On the other hand, the ribs 98b and 99b extend in the vehicle longitudinal direction in the condition where the battery case 20 is mounted to the vehicle, and they are disposed in parallel to each other. The rib 100b is composed of a part x1 which is parallel to the ribs 98b, 99b and is shorter than the ribs 98b, 99b in height (dimension along the vehicle longitudinal direction in the condition where the battery case 20 is mounted to the vehicle body) and a part x2 which is longer than the part x1 in height and which is T-shaped as viewed in the vehicle longitudinal direction.

In the mounted state as shown in FIG. 17, the fuse 99 is seated on the part x1 of the rib 100, and is held between the ribs 98b, 99b and the T-shaped part x2 of the rib 100b. In addition, the insulator block 74 is seated on the rib 97b shown in FIG. 16, and is held between the part-of-cylinder shaped members constituting the ribs 94b, 95b and 96b.

The insulator block 74 holds the female-side terminals 73, and accommodates the harness 105 (composed of electric wires 771 and 772 and a signal line 773) led out to the fuse 99 side. The insulator block 74 is provided with flange parts 741 and 742 by which the circumferential edge of the opening 103 formed by combination of the cutouts 101 and 102 provided in the bottom wall 85 of the battery case 20 is clamped from the inside and the outside of the bottom chamber 20B. The outer circumferential shape of that part 743 (see FIG. 25) of the insulator block 74 located between the flanges 741 and 742 is set to have such dimensions as to fit to the inner circumference of the opening 103.

In this manner, the fuse 99 and the insulator block 74 are simultaneously held in the battery case 20 by combination or assembly of the front part 20F and the rear part 20Rr of the battery case 20, without using any fastening part such as bolts or setscrews.

Now, the procedure and operations in mounting the battery pack 19 to the battery pack cover 28 will be described below. FIGS. 18A to 18D are views showing the positional relationship between the battery pack 19 and the terminal base 29 at the time of mounting the battery pack 19 to the battery pack cover 28. FIGS. 19A to 19D are views showing the positional relationship between the battery pack cover 28 as well as the terminal base 29 and the battery pack 19, as viewed from a right upper rear side of the vehicle body, corresponding respectively to FIGS. 18A to 18D. At the time of an operation of mounting or detaching the battery pack 19, the motorcycle 1 is left standing in a leftwardly inclined posture by use of the side stand. Therefore, the terminal base 29 is not set upright but is inclined to the left side by an angle of about 12 degrees, for example. For simplification, however, the motorcycle 1 is shown to be set upright in FIGS. 18A to 18D and FIGS. 19A to 19D.

In FIGS. 18A to 18D, the battery pack support part 295 composed of the end engagement projections 59, 59 and the central engagement projection 66 has slant surfaces 59d, 66d formed to be slanted down toward the right side of the vehicle body from a peak portion 29P (composed of the peak portions 59P, 66P). The slant surfaces 59d, 66d have an angle α (for example, the angle α is 35 degrees) relative to the base 292.

Figure 18A:
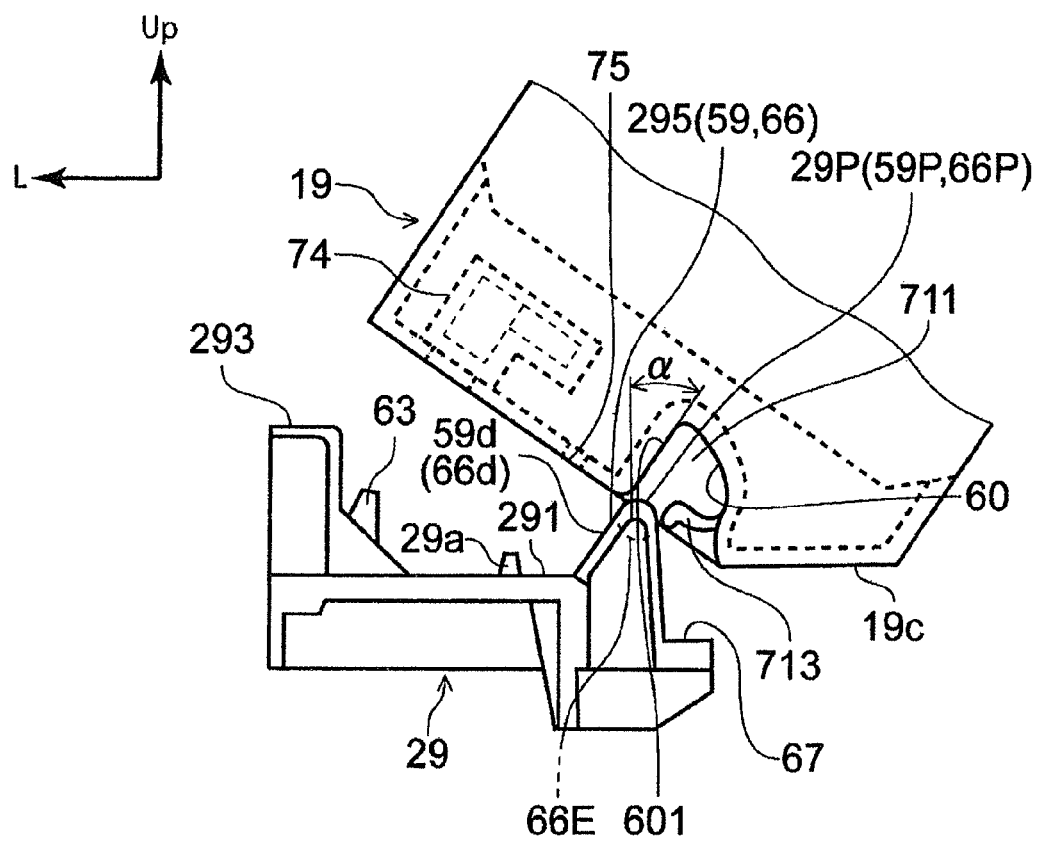
FIG. 18A is a view showing the positional relationship between the battery pack and the terminal base at the time of mounting the battery pack to the battery pack cover.
Figure 19A:
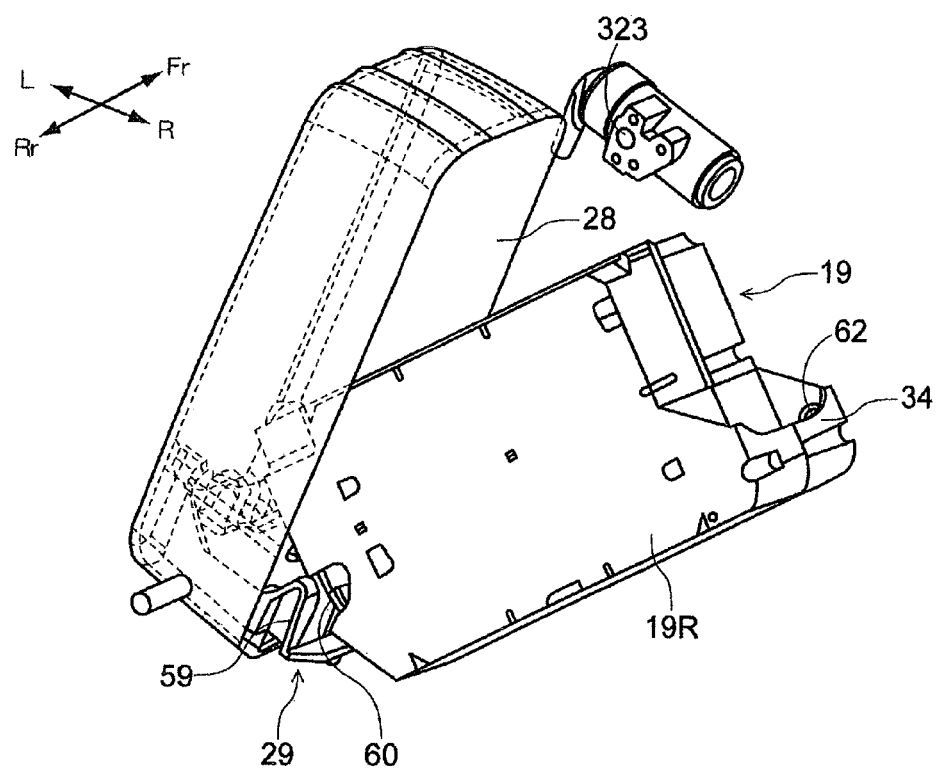
FIG. 19A is a view showing the positional relationship between the battery pack cover as well as the terminal base and the battery pack, as viewed from a right upper rear side of the vehicle body, corresponding to FIG. 18A.

First, in FIGS. 18A and 19A, the battery pack 19 is brought closer to the terminal base 29 from a right upper side of the vehicle body. It is recommendable to operate the battery pack 19 while gripping the handle 34 by the right hand and supporting the part 19R, on the side where the handle 34 is formed, by the left hand. In this case, the battery pack 19 is brought closer to the terminal base 29 in such a manner that the vertical walls of the end engagement recesses 60 and the central engagement recess 70 (the vertical wall 601 of the end engagement recess 60 is taken as a representative of these vertical walls in the description here) formed by the rib 71 and the rib 72 provided at a bottom portion of the battery case 20 are substantially along the slant surfaces 59d, 66d of the battery pack support part 295 and that the peak portion 29P of the battery pack support part 295 of the battery pack support part 295 is opposed to the end engagement recesses 60 and the central engagement recess 70 from the lower side of the battery pack 19.

In addition, as has been described referring to FIG. 11, the rib 71 is composed of the parts 711 and 712, while the rib 72 is composed of the parts 721 and 722. In addition, the peak portion of the battery pack support part 295 is composed of the peak portions 59P and 66P.

In the posture as shown in FIG. 18A and FIG. 19A, the battery pack cover 28 is covering only the depth side of the terminal base 29 (the side which is the left side of the vehicle body and on which the male-side terminals 63 are provided) and is not covering the battery pack support part 295. This permits the operator to clearly recognize visually the positional relationship between the end engagement projections 59 and the end engagement recesses 60.

Figure 18B:
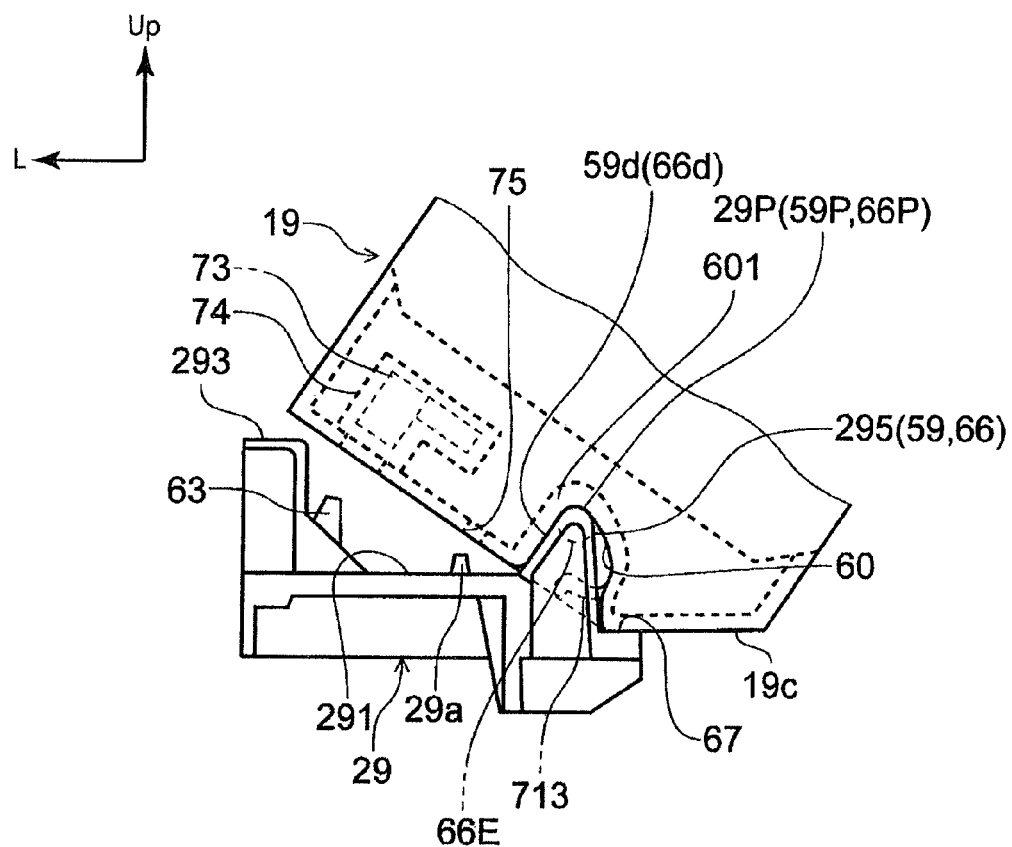
FIG. 18B is a view showing the positional relationship between the battery pack and the terminal base at the time of mounting the battery pack to the battery pack cover.
Figure 19B:
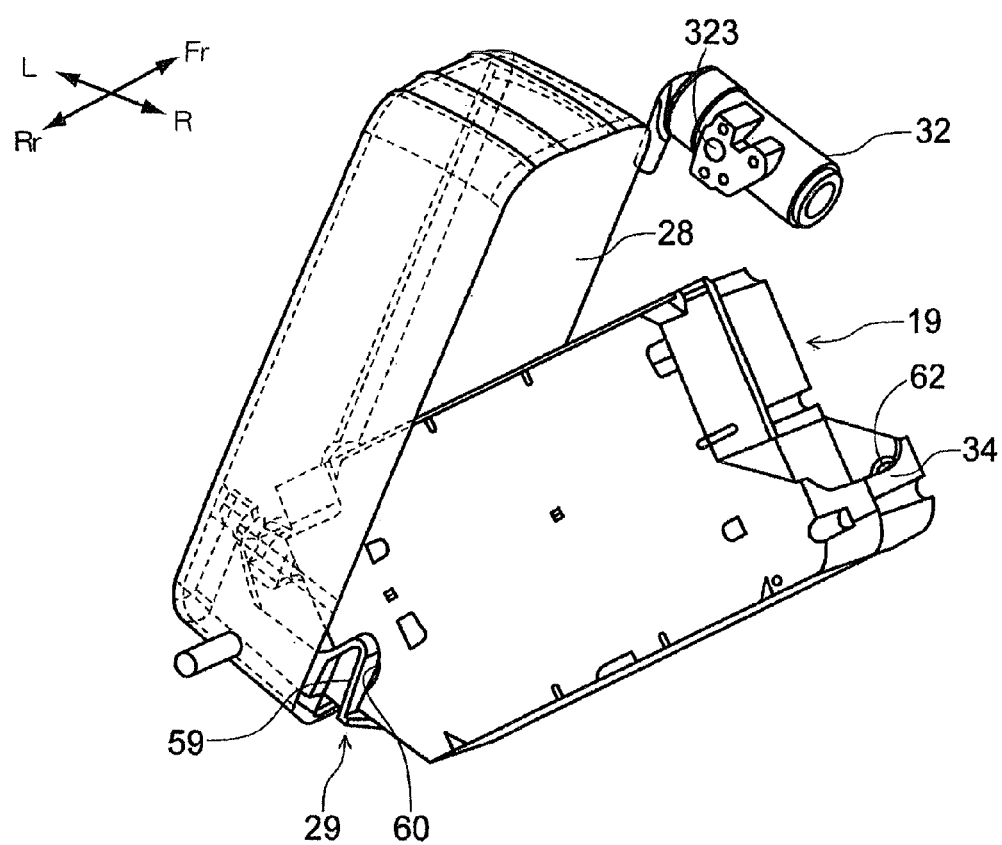
FIG. 19B is a view showing the positional relationship between the battery pack cover as well as the terminal base and the battery pack, as viewed from a right upper rear side of the vehicle body, corresponding to FIG. 18B.

Next, starting from the posture as shown in FIGS. 18A and 19A, the hand supporting the battery pack 19 is slightly loosened. As a result, the battery pack 19 slides downward on the vertical wall 601 along the slant surfaces 59d, 66d, to be moved into the position as shown in FIGS. 18B and 19B. In the posture as shown in FIGS. 18B and 19B, the peak portion 29P of the battery pack support part 295 has reached the uppermost portions of the end engagement recesses 60. In this instance, a surface 19c formed by cutting a corner (corner located on the right side of the vehicle body) of a bottom portion of the battery pack 19 makes contact with the upper surface of the shelf 67 of the battery pack support part 295.

Therefore, in this position, it is ensured that even if the operator further loosens the hand supporting the battery pack 19, the battery pack 19 is tentatively placed on the terminal base 29 by only lightly supporting the battery pack 19. Thus, during the operation of mounting the battery pack 19 which has a comparatively heavy weight, the hand gripping the battery pack 19 can once been loosened, which is effective in alleviating the burden in the mounting operation.

Figure 18C:
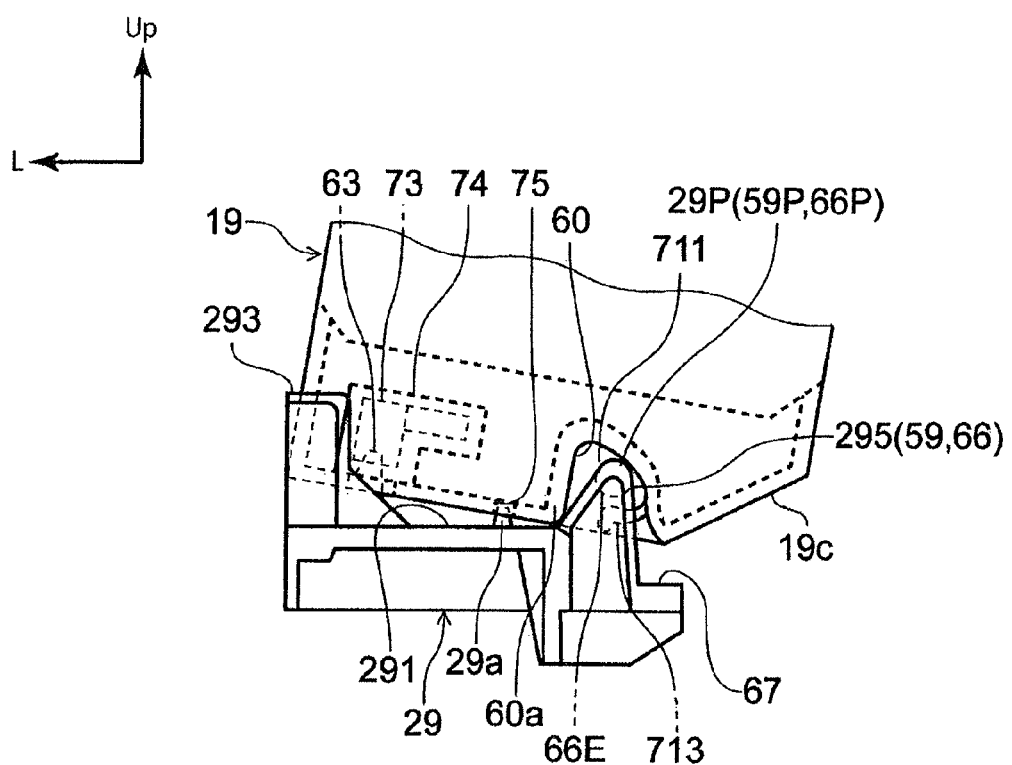
FIG. 18C is a view showing the positional relationship between the battery pack and the terminal base at the time of mounting the battery pack to the battery pack cover.
Figure 19C:
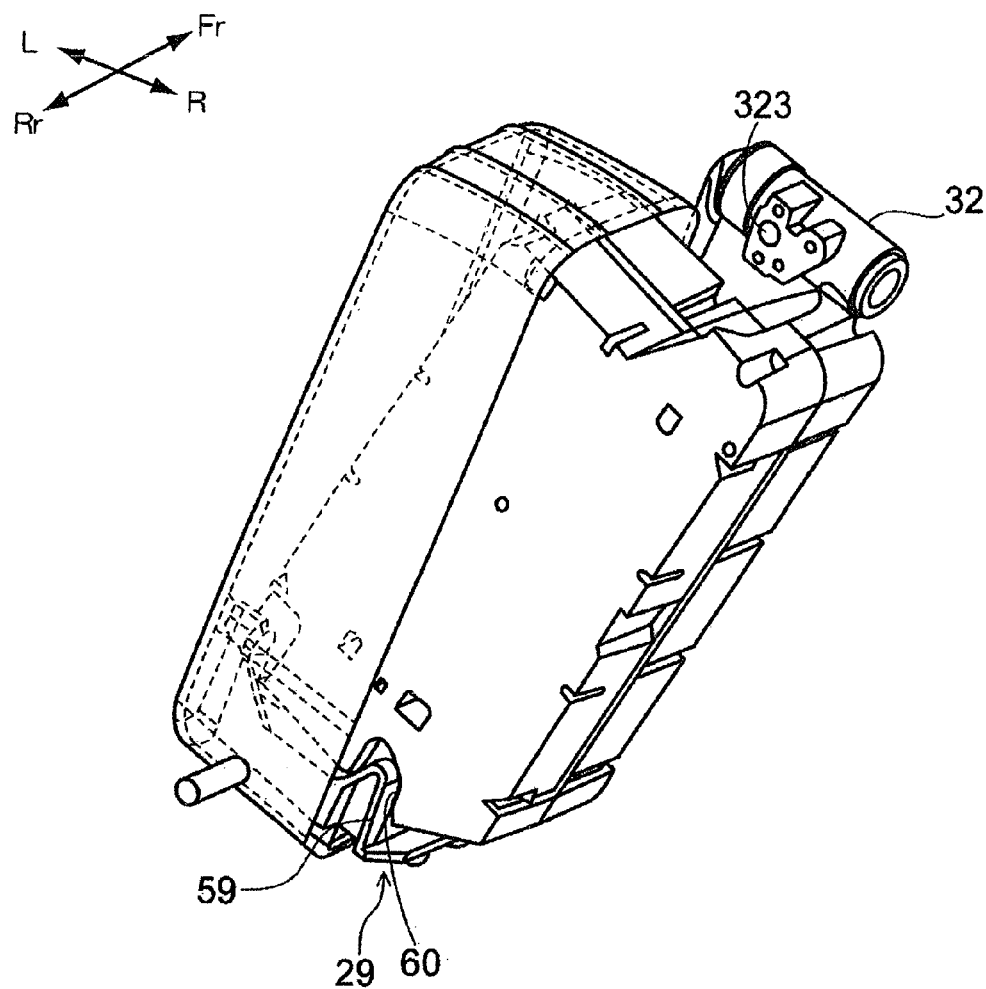
FIG. 19C is a view showing the positional relationship between the battery pack cover as well as the terminal base and the battery pack, as viewed from a right upper rear side of the vehicle body, corresponding to FIG. 18C.

Subsequently, an operation is conducted by which the battery pack 19 being tentatively placed in the inclined posture is tilted up toward the left side of the vehicle body, to be put into an upright state. During this operation, as shown in FIGS. 18C and 19C, the posture of the battery pack 19 relative to the terminal base 29 is changed with corner portions 60a of the end engagement recesses 60 as a fulcrum, and the surface 19c is separated from the shelf 67 of the terminal base 29. In the position as shown in FIGS. 18C and 19C, the male-side terminals 63 projecting to the upper side of the terminal base 29 start being engaged with the insulator block 74 accommodating the female-side terminals 73 of the battery pack 19. The tips of the male-side terminals 63 are beveled on the left side of the vehicle body, namely, on the depth side in the battery insertion direction. This ensures that the tips of the male-side terminals 63 are prevented from abutting against a corner portion of the opening of the insulator block 74 (a corner portion of the opening by which the male-side terminals 63 are guided to an insertion port for insertion into the female-side terminals 73). The detailed shape of the male-side terminals 63 will be described later referring to FIGS. 21 and 23, etc.

Figure 18D:
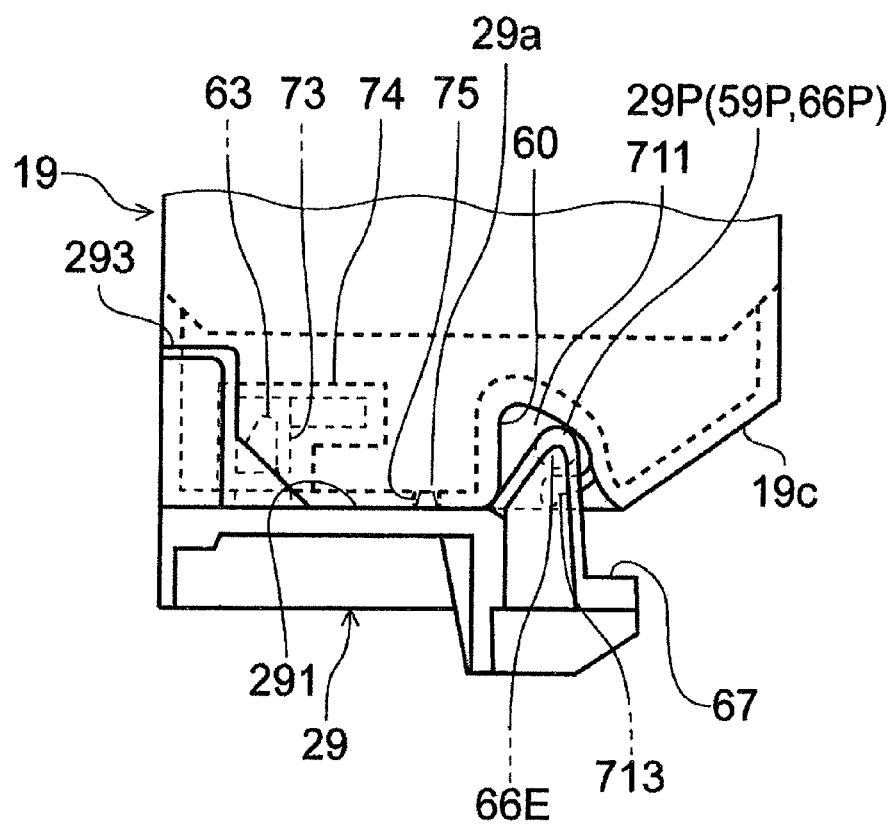
FIG. 18D is a view showing the positional relationship between the battery pack and the terminal base at the time of mounting the battery pack to the battery pack cover.
Figure 19D:
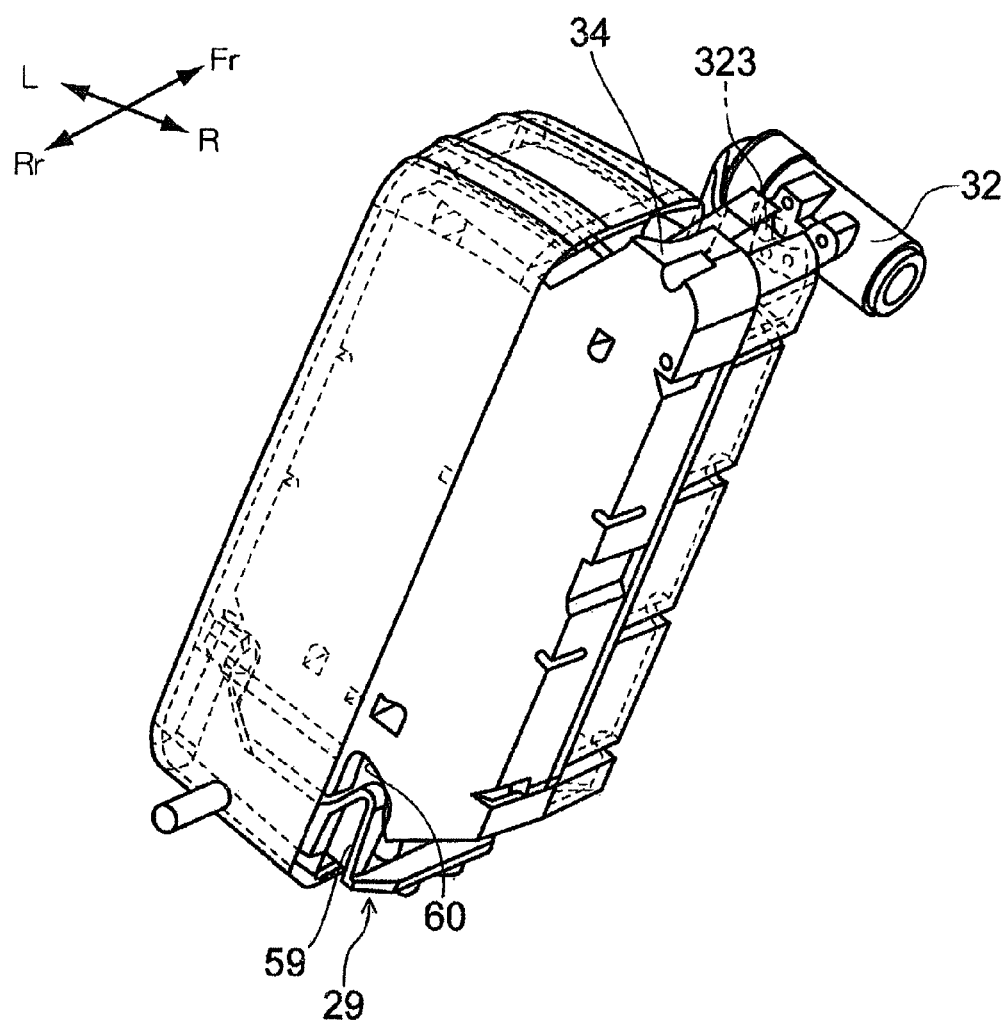
FIG. 19D is a view showing the positional relationship between the battery pack cover as well as the terminal base and the battery pack, as viewed from a right upper rear side of the vehicle body, corresponding to FIG. 18D.

In FIGS. 18D and 19D, the battery pack 19 is seated on the terminal base 29. In this position, the bottom surface of the battery pack 19 is in contact with the upper surface of the base 292, and the male-side terminals 63 are electrically in contact with the female-side terminals 73. In this position, the engagement hole 62 formed in the front wall 76 of the handle 34 of the battery pack 19 is opposed to the lock pin 323 of the lock device 32. Here, when the key is inserted into the key hole of the lock device 32 and turned to a predetermined lock position, the lock pin 323 is protruded and fitted into the engagement hole 62. As a result, the battery pack 19 situated on the terminal base 29 is locked to the main frame 3 of the motorcycle 1.

In the position where the battery pack 19 is seated on the terminal base 29, the stopper 66E projecting from the peak portion 66P of the central engagement projection 66 of the battery pack support part 295 is in engagement with the inner circumferential surfaces (upper side surfaces) of the link part 713 between the parts 711 and 712 of the rib 71 and the link part 723 (see FIG. 11) between the parts 721 and 722 of the rib 72. This ensures that the battery pack 19 is restrained in position in the vertical direction.

Further, the position of the battery pack 19 on the terminal base 29 in the direction parallel to the upper surface of the base 292 is restrained by those contact portions of the end engagement recesses 60, 60 and the central engagement recess 70 which make contact with the end engagement projections 59, 59 and the central engagement projection 66. In addition, the position is restrained also by the fitting between the cutout 75 formed in a bottom portion of the front part 20F of the battery case 20 and the projected part 29a on the terminal base 29.

At the time of detaching the battery pack 19 from the terminal base 29 and the battery pack cover 28, operations reverse to the above-mentioned operations are carried out. Specifically, the lock device 32 is operated with the key, to pull out the lock pin 323 from the engagement hole 62. This results in that the battery pack 19 can be tilted to the right side of the vehicle body. When the upper side of the battery pack 19 is tilted to the vehicle body right side by gripping the handle 34 and the battery pack 19 is pulled upward, therefore, the battery pack 19 can be detached from the motorcycle 1.

Figure 20:
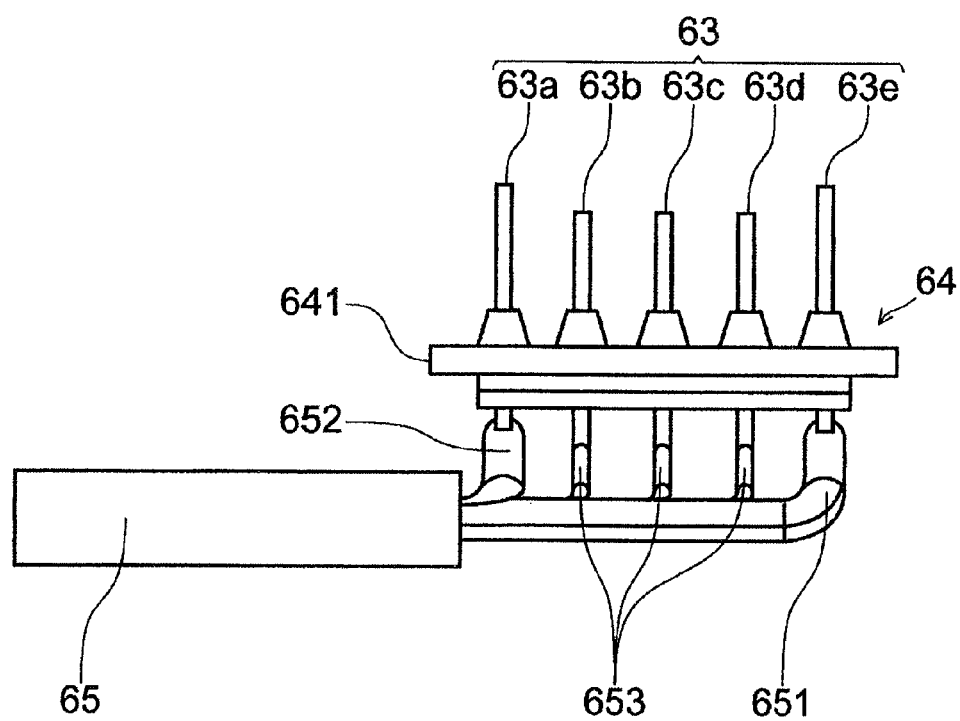
FIG. 20 is a front view (as viewed from the right side of the vehicle body) of a male-side terminal unit.
Figure 21:
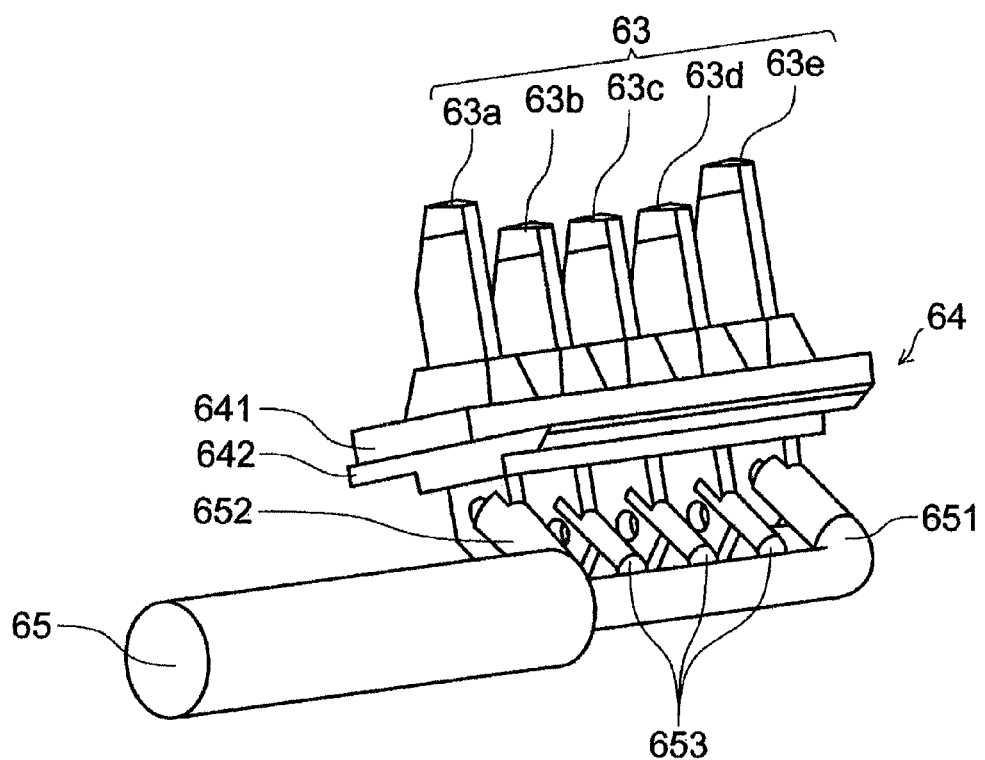
FIG. 21 is a perspective view (as viewed from a rear lower side of the vehicle body) of the male-side terminal unit.
Figure 22:
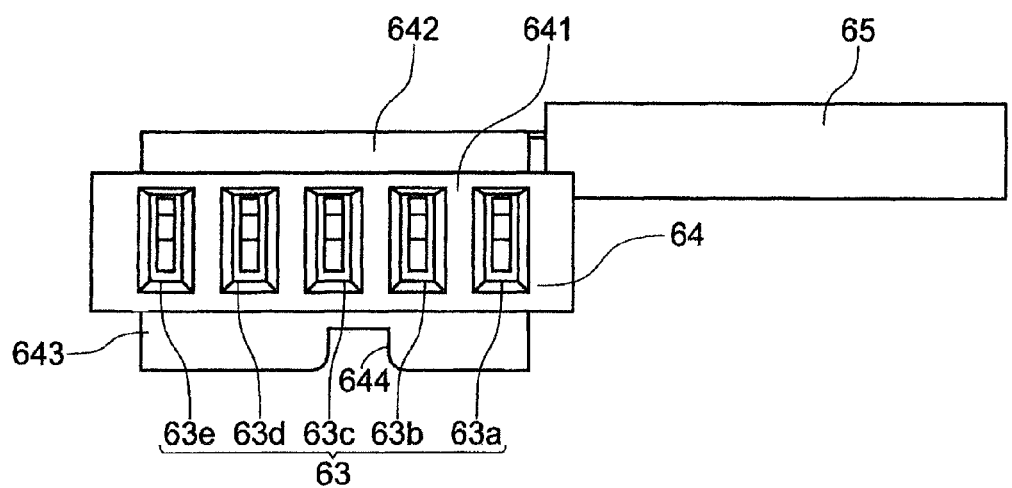
FIG. 22 is a plan view of the male-side terminal unit.
Figure 23:
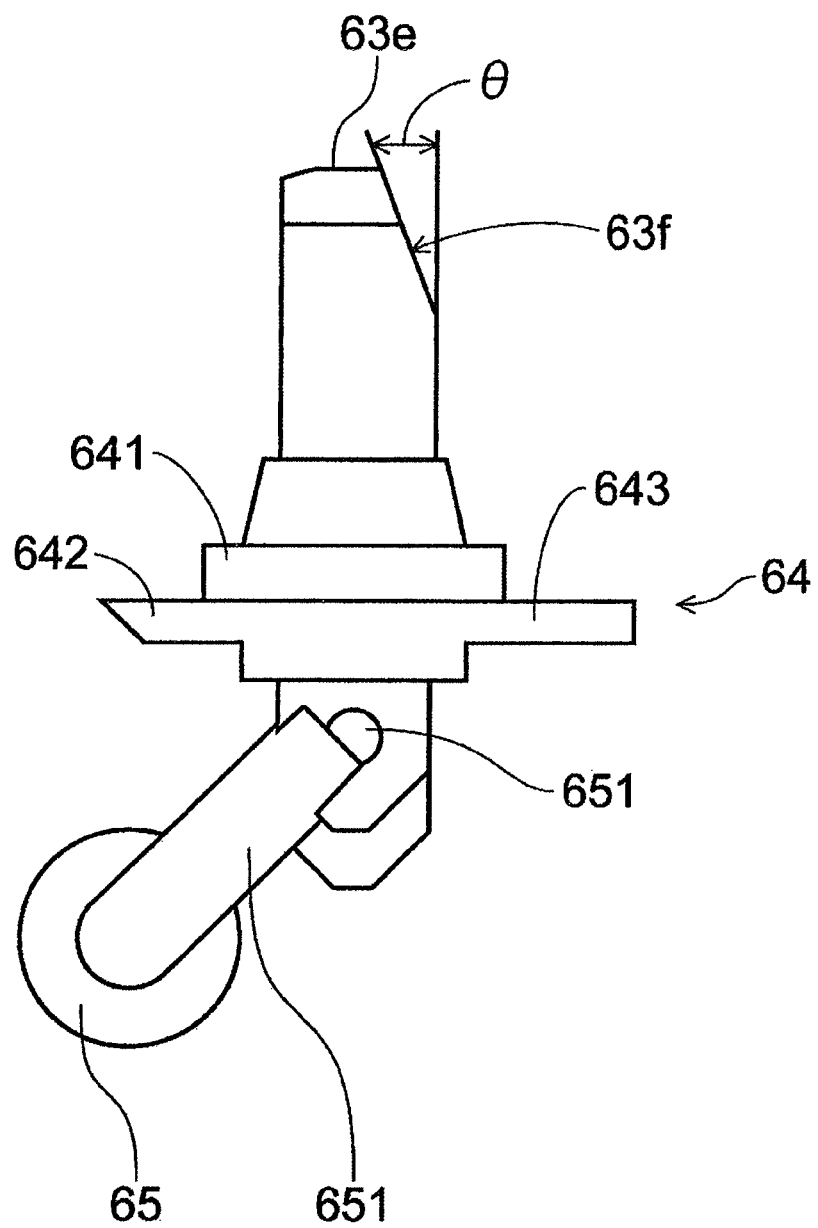
FIG. 23 is a side view (as viewed from the front side of the vehicle body) of the male-side terminal unit.

FIG. 20 is a front view (as viewed from the right side of the vehicle body) of a male-side terminal unit, FIG. 21 is a perspective view (as viewed from a rear right lower side of the vehicle body) of the male-side terminal unit, FIG. 22 is a plan view of the male-side terminal unit, and FIG. 23 is a side view (as viewed from the front side of the vehicle body) of the male-side terminal unit. In FIGS. 20 to 23, a plurality of (here, five) male-side terminals 63 are provided and arrayed in the vehicle longitudinal direction when the battery pack 19 is mounted to the motorcycle 1.

Of the plurality of male-side terminals 63, two are power terminals 63a and 63e that are connected respectively to the plus side and the minus side of the battery pack 19, and the remaining ones are signal line terminals 63b, 63c and 63d which are connected to signal lines. The power terminals 63a, 63e are so disposed that their tips are located above the tips of the signal line terminals 63b, 63c, 63d. In other words, the power terminals 63a, 63e are set to be larger in projection length than the signal line terminals 63b, 63c, 63d. This ensures that at the time of terminal connection, signal circuits are connected after the power supply is connected. In addition, at the time of terminal disconnection, the power supply is disconnected after the signal circuits are disconnected. This contributes to an enhancement of the durability of the terminals. The dimensions of the power terminals 63a, 63e are determined taking heat capacity into consideration. As the signal line terminals 63b 63c, 63d, those that are the same as the power terminals 63a, 63e in dimensions may be used, or those which are smaller than the power terminals 63a, 63e may be used.

As shown in FIG. 23, as for the tip of the male-side terminal 63, the corner 63f on the vehicle-width-directionally left side is obliquely cut at an angle θ relative to the lengthwise direction of the male-side terminal 63; thus, the tip is tapered off as viewed in the vehicle rear-side direction. The number of the signal line terminals is not limited to three, and may be increased or decreased, as required. Or, alternatively, the number of the signal line terminals may be fixed, for example, to five, and all or part of them may be solely used according to situations, for example, the model and grade, etc. of the motorcycle 1.

The male-side terminal 63 is provided to orthogonally penetrate the insulator board 64. To that portion of the male-side terminal 63 which is located below the insulator board 64, electric wires 651 and 652 or signal lines 653, 653, 653 are connected that are branched from the harness 65.

The insulator board 64 includes a main part 641 to be fitted into the opening 291 formed in the terminal base 29, a right-side edge 642 projecting from the main part 641 to the vehicle body right side to be clamped between the main part 641 and the upper guides 298 of the terminal base 29, and a left-side edge 643 projecting from the main part 641 to the vehicle body left side to be engaged with the stopper 300 extending from the terminal base 29. The left-side edge 643 is formed with a recess 644. The tip of the stopper 300 comes around to the upper side of the lower guide 301 of the insulator board 64 while avoiding the recess 644. The insulator board 64 is fixed by being clamped between the stopper 300 and the lower guide 301 of the terminal base 29 (see FIGS. 8 and 9, as well).

Figure 24:
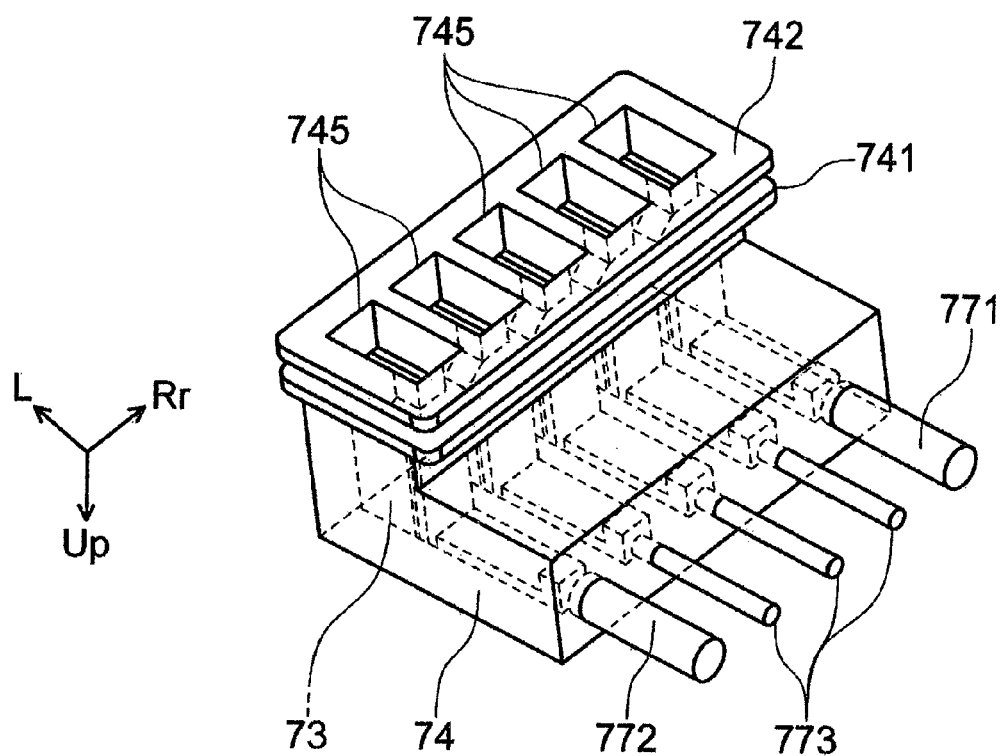
FIG. 24 is a perspective view of an insulator block 74 with female-side terminals accommodated therein, as viewed from a right lower front side of the vehicle body.
Figure 25:
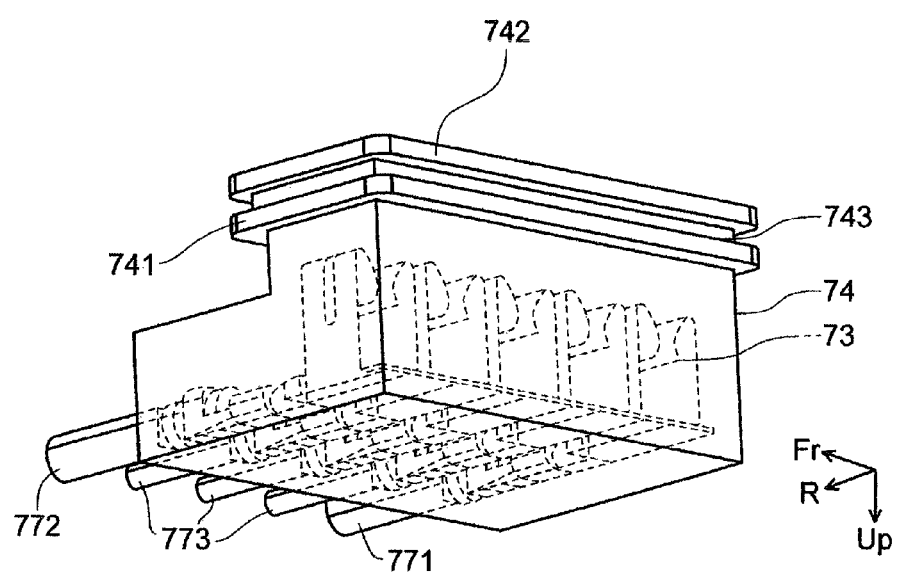
FIG. 25 is a perspective view of the insulator block with the female-side terminals accommodated therein, as viewed from a left upper rear side.
Figure 26:
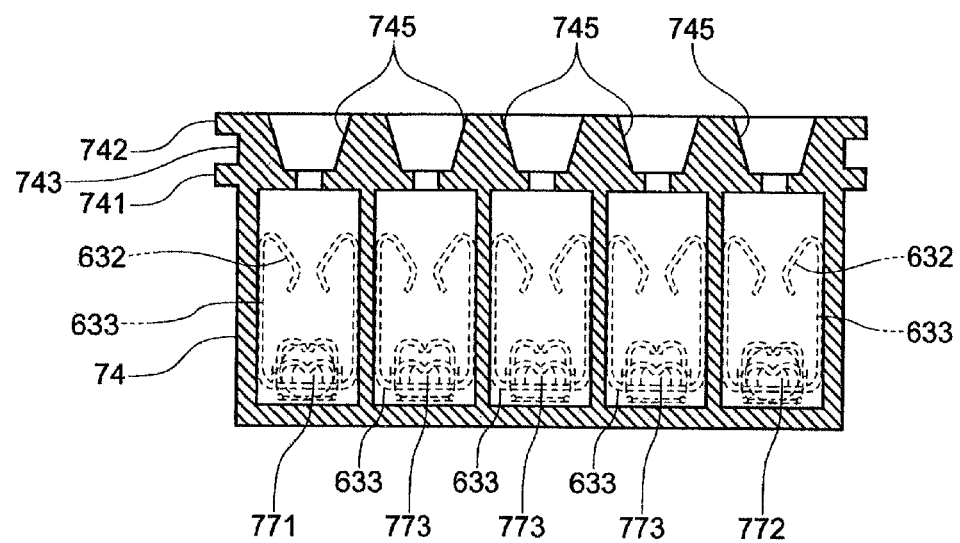
FIG. 26 is a sectional view of the insulator block, as viewed from the left side of the vehicle body, at contact parts of the female-side terminals.

FIG. 24 is a perspective view of the insulator block 74 with the female-side terminals 73 accommodated therein, as viewed from a right lower front side of the vehicle body, FIG. 25 is a perspective view of the same as viewed from a left upper rear side, and FIG. 26 is a sectional view of the insulator block 74, as viewed from a left side of the vehicle body, at contact parts of the female-side terminals 73.

In FIGS. 24 to 26, the insulator block 74 is formed in its upper portion with plural (in this example, five) openings 745 in which to insert the plurality of male-side terminals 63 (63a to 63e). The opening 745 is rectangular in cross section, and has taper surfaces such that the aperture area is narrowed toward the female-side terminal 73 located in the depth. The female-side terminal 73 is located on the side where the aperture area is narrowed, of the opening 745. The female-side terminal 73 has a connection part 633 which extends to the upper side from two connection parts 632 and 632 for clamping from two sides the male-side terminal 63 inserted as shown in FIG. 26 and which is connected to electric wires 771 and 772 or a signal line 773. For avoiding intricateness, only those of the connection parts 632 and 633 which are located at vehicle-longitudinal-directionally both ends are denoted by the reference numerals.

At the outer circumference of the part surrounding the openings 745, the flange parts 741 and 742 are formed by which the circumferential edge of the opening 103 formed in the bottom portion of the battery case 20 is clamped from the inside and the outside of the bottom chamber 20B. The part 743 located between the flange parts 741 and 742 has dimensions so set as to conform to the inner edge of the opening 103.

Now, the positional relationship between the male-side terminals 63 and the female-side terminals 73 corresponding to the positional relationship between the battery pack 19 and the terminal base 29 will be described below. FIGS. 27A to 27E are sectional views showing the positional relationship between the male-side terminal 63 and the female-side terminal 73, as viewed from the rear side of the vehicle body. First, in FIG. 27A, the insulator block 74 with the female-side terminal 73 accommodated therein is brought closer to the male-side terminal 63 from a right upper side of the vehicle body.

Figure 27A:
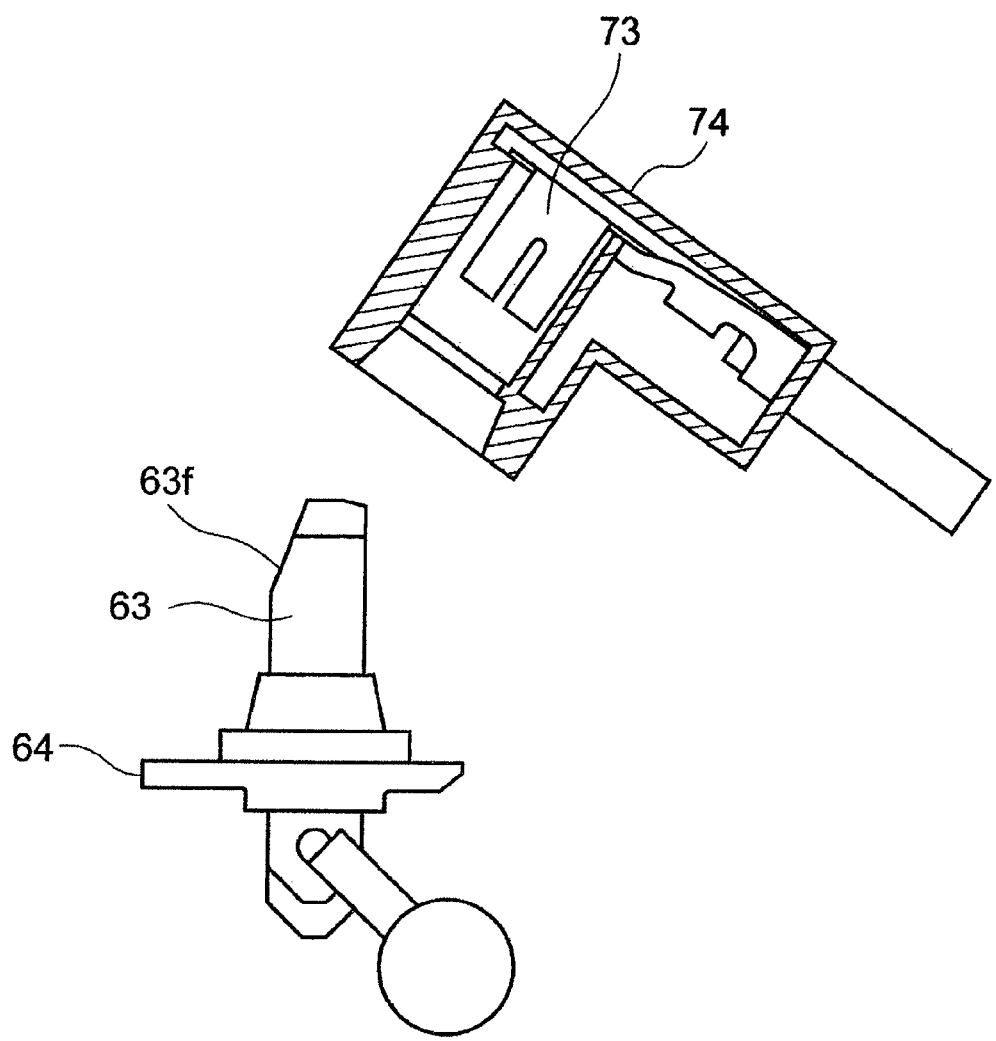
FIG. 27A is a sectional view showing the positional relationship between the male-side terminal and the female-side terminal, as viewed from the rear side of the vehicle body.
Figure 27B:
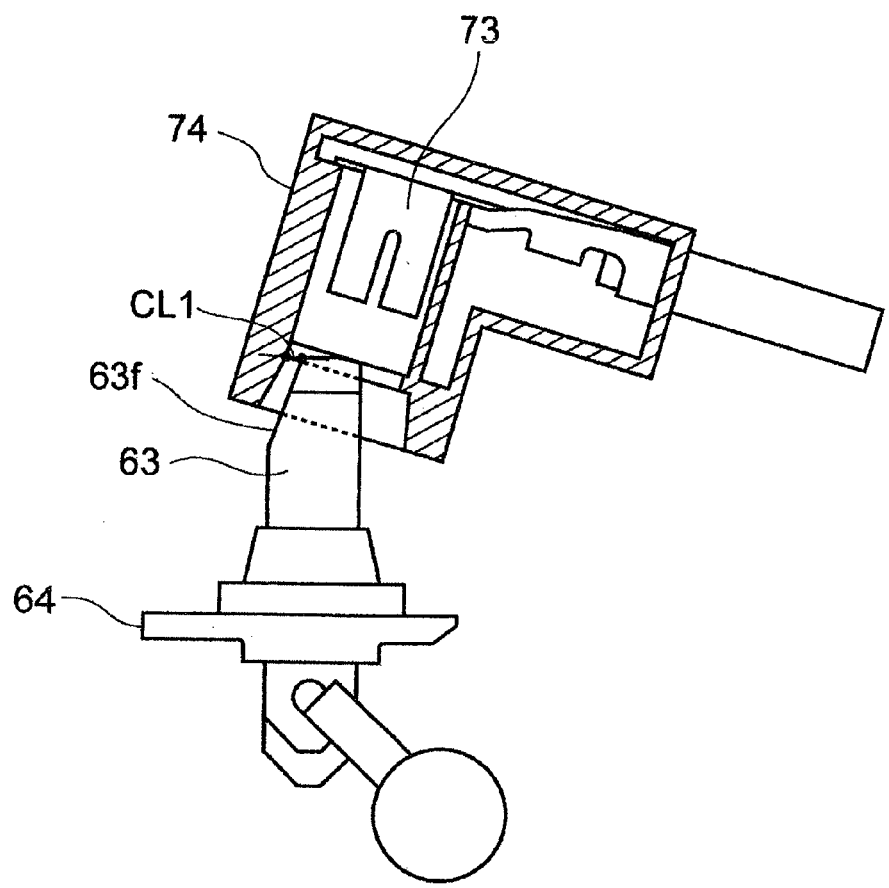
FIG. 27B is a sectional view showing the positional relationship between the male-side terminal and the female-side terminal, as viewed from the rear side of the vehicle body.

In FIG. 27B, the tip of the male-side terminal 63 is in such a position that it is partly inserted in the insulator block 74. Since the opening 745 of the insulator block 74 is formed with a taper, a large clearance CL1 is maintained between the corner 63f formed by obliquely cutting the tip of the male-side terminal 63 and the insulator block 74.

Figure 27C:
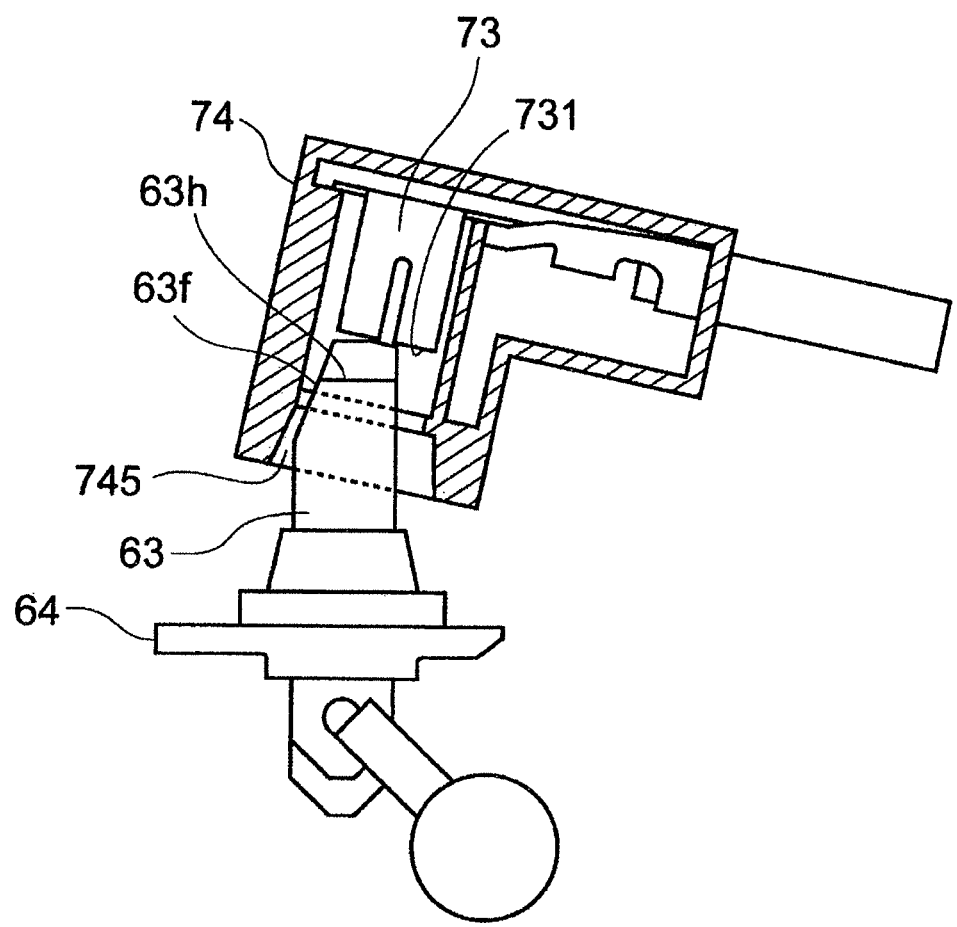
FIG. 27C is a sectional view showing the positional relationship between the male-side terminal and the female-side terminal, as viewed from the rear side of the vehicle body.

In FIG. 27C, the tip of the male-side terminal 63 is in contact with an end portion (an end portion on the side of the opening 745) of the female-side terminal 73 inside the insulator block 74. In this position, the corner 63f of the male-side terminal 63 and the taper surface of the opening 745 of the insulator block 74 are roughly parallel to each other.

A tip portion of the male-side terminal 63 is smashed so that plate thickness decreases toward the tipmost portion. A ridgeline 63h exists at the boundary between the portion of the smashed shape and the portion where the plate thickness is maintained.

Figure 27D:
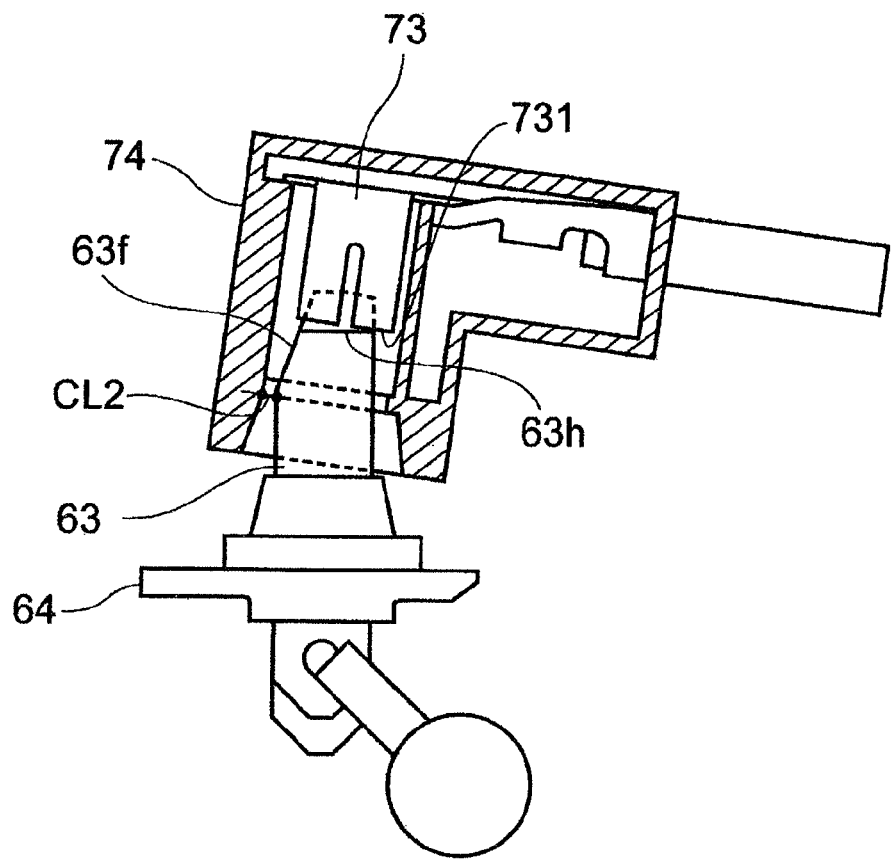
FIG. 27D is a sectional view showing the positional relationship between the male-side terminal and the female-side terminal, as viewed from the rear side of the vehicle body.

In FIG. 27D, the ridgeline 63h at the tip portion of the male-side terminal 63 and the end portion 731 of the female-side terminal 73 are roughly parallel to each other. In this instance, the clearance CL2 between the corner 63f of the male-side terminal 63 and the insulator block 74 is smaller than the clearance CL1. However, the male-side terminal 63 and the insulator block 74 are not in contact with each other.

Figure 27E:
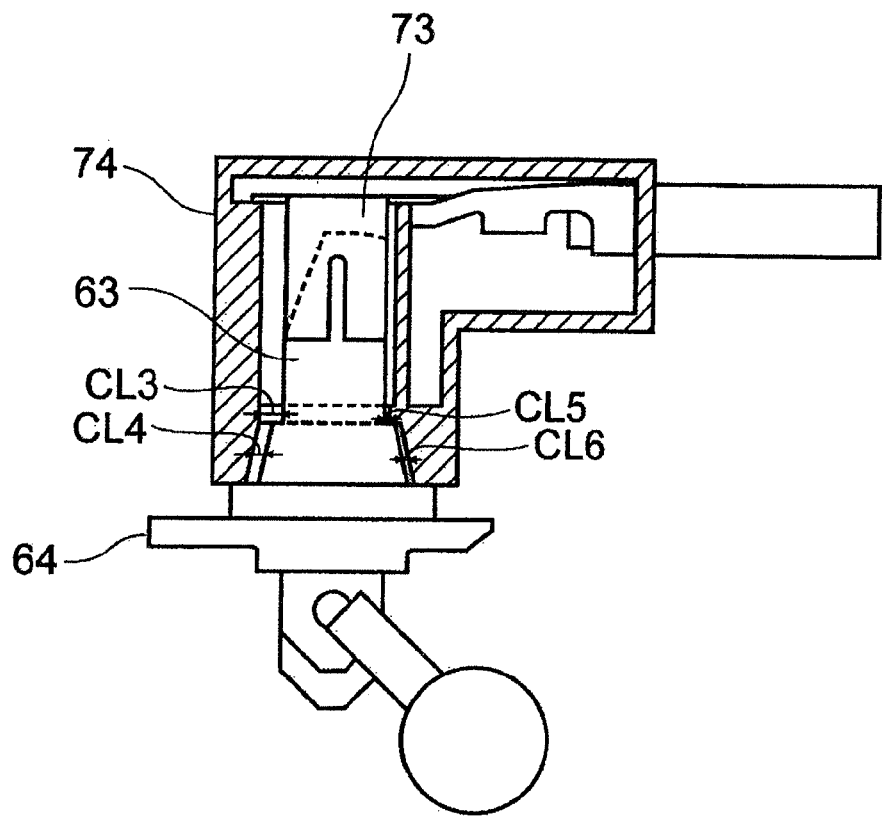
FIG. 27E is a sectional view showing the positional relationship between the male-side terminal and the female-side terminal, as viewed from the rear side of the vehicle body.
Figure 28:
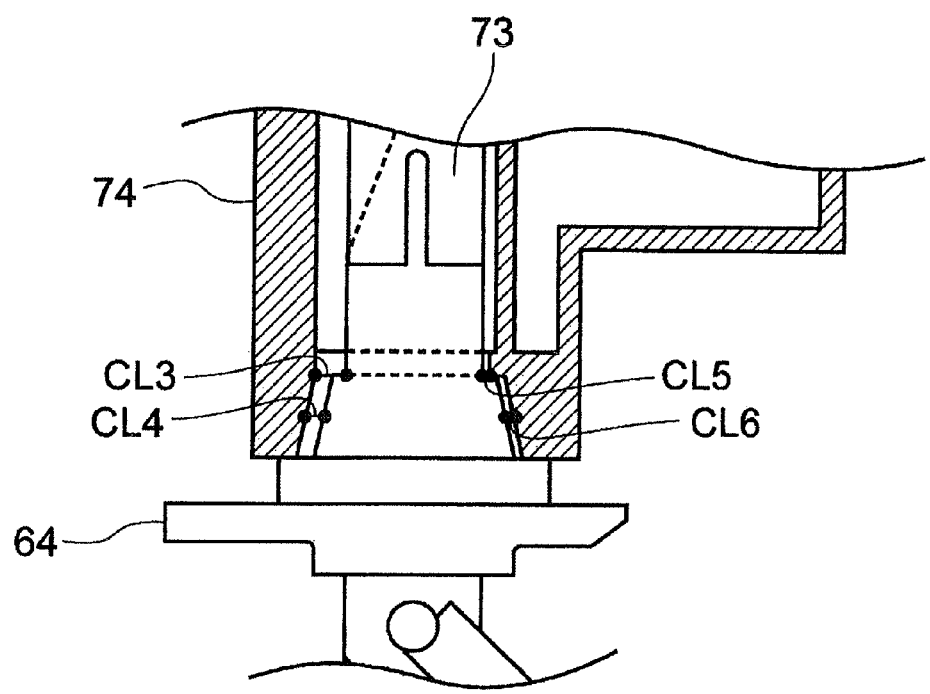
FIG. 28 shows an enlarged view of an essential part of FIG. 27E.

In FIG. 27E, there is shown a connected state where the battery pack 19 is mounted on the terminal base 29 in the position as shown in FIG. 18D. In this state, the male-side terminal 63 has entered into the female-side terminal 73, and the connection has been completed. In this state, on one side (the vehicle body left side) of the male-side terminal 63, clearances CL3 and CL4 are maintained between the male-side terminal 63 and the insulator block 74. On the other side (the vehicle body right side) of the male-side terminal 63, also, clearances CL5 and CL6 are maintained, which are smaller than the clearances CL3 and CL4, though. FIG. 28 shows an enlarged view of an essential part of FIG. 27E.

The handle 34 formed at an upper portion of the battery case 20 is provided at a position deviated toward the right side of the battery pack 19. Therefore, it suffices for the middle chamber 20M as the battery cell accommodating part to be located just under the main frame 3 of the motorcycle 1. This ensures that the handle 34 itself on the right side of the main frame 3 can be raised to such an upper position so as to overlap with the main frame 3 in side view of the vehicle body. With the handle 34 thus located at an upper position, the middle chamber 20M can be enlarged, and more battery cells can be accommodated therein.

In addition, while the main frame 3 of the motorcycle 1 is a monocoque-type simple one, this is not restrictive. An under frame extending downward from the head pipe 2 to be joined at its rear end to lower end portions of the pivot plates 4 may be provided.

Figure 29:
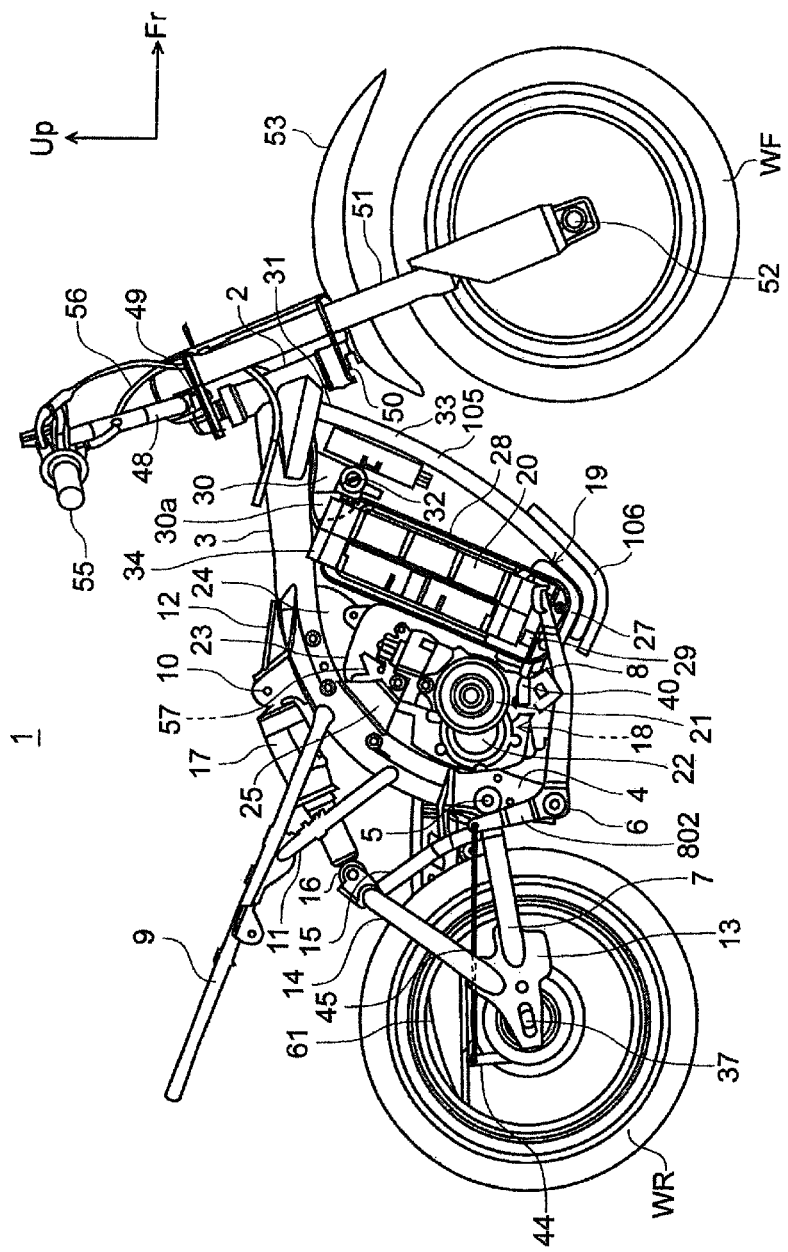
FIG. 29 is a right side view of an essential part of a motorcycle provided with an under frame.

FIG. 29 is a right side view of an essential part of the motorcycle 1 provided with an under frame. In FIG. 29, a skid plate 106 may be provided forwardly of (on the vehicle body front side of) the under frame 105. It suffices for the skid plate 106 to cover a front lower side of the battery pack 19, at least. However, it is preferable to provide the skid plate 106 so as to range from the front side of the under frame 105 to the motor case 23. This is for protecting the battery pack 19 and the motor case 23 from small stones, sand, mud or water, etc. flying from the front and lower sides of the motorcycle 1. In addition, where the under frame 105 is provided, as shown in FIG. 29, the PDU 33 can be mounted not to the bracket 31 but to the under frame 105.

Further, in FIG. 29, a lock device support stay 30 for fixing the lock device 32 can extend toward the vehicle body rear side to form a part 30a, and an upper portion of the battery pack cover 28 can be connected by the thus extended part 30a. This ensures that the battery cover 28 can be supported at its lower portion by the battery pack holding stay 27 extending from the motor case 23, and at its upper portion by the lock device support stay 30.

The present invention is not limited to the above-described embodiment, and modifications are possible within the scope of claims. For instance, the lock device 32 is not restricted to one wherein the lock pin is advanced and retracted manually. For example, a configuration may be adopted wherein the lock pin can be actuated by an actuator such as a solenoid or a motor, and the actuator is remote controlled by use of an electronic key or keys.

Furthermore, the lock device 32 is not restricted to one that is disposed at a front portion of the battery pack 19. The lock device 32 may be one that is disposed on the vehicle body rear side in relation to the battery pack 19. In that case, the engagement hole 62 for the lock pin 323 is not provided on the side of the front part 20F of the battery case 20 but is provided on the side of the rear part 20Rr of the battery case 20.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply device for an electric vehicle, which comprises a battery case for accommodating battery cells for supplying electric power to an electric motor of an electric vehicle and which can be mounted to and detached from the electric vehicle, comprising:
    an extension part of said battery case extending to above a battery cell accommodating part;
    a handle provided on the extension part, said handle including a grip part having an orientation extending in a vehicle longitudinal direction when the power supply device is mounted on the electric vehicle;
    an engagement part for engagement with a movable part of a lock device attached to the electric vehicle is formed at either of longitudinal-directionally side surfaces of the electric vehicle in relationship to the handle;
    a motor case wherein the electric motor is accommodated, said motor case being supported on the main frame;
    a terminal base, a male-side terminal coupled to a female-side terminal being disposed at a lower portion of the battery case and connected to the terminal base;
    a battery pack cover provided with the terminal base at a lower portion thereof and having a space such that the battery case can be disposed at an upper portion of the terminal base; and
    a battery pack support stay for connecting the battery cover to the motor case.

2. The power supply device for the electric vehicle according to claim 1, wherein the movable part of the lock device is a lock pin advanced and retracted in the longitudinal direction of the electric vehicle in relation to the lock device, and the engagement part is an engagement hole for accepting the lock pin.

3. The power supply device for the electric vehicle according to claim 1, wherein the electric vehicle includes:
    a main frame being of a monocoque form that has an upwardly curved shape;
    a pivot by which a front end of a swing arm is supported on the main frame;
    said electric motor being disposed on a front side of the pivot in the longitudinal direction of the electric vehicle; and
    a power drive unit disposed on a further front side of the electric motor;
    said power supply device being disposed between the electric motor and the power drive unit.

4. The power supply device for the electric vehicle according to claim 2, wherein the electric vehicle includes:
    a main frame being of a monocoque form that has an upwardly curved shape;
    a pivot by which a front end of a swing arm is supported on the main frame;
    said electric motor being disposed on a front side of the pivot in the longitudinal direction of the electric vehicle; and
    a power drive unit disposed on a further front side of the electric motor;
    said power supply device being disposed between the electric motor and the power drive unit.

5. The power supply device for the electric vehicle according to claim 3,
    wherein the extension part is deviated toward either of the vehicle-width-directionally left and right sides in relation to the battery case in a condition where the battery case is mounted on the electric vehicle, and at least an upper portion of the extension part extends to such a position so as to overlap, in side view of the vehicle, with that portion of the main frame which is located above the battery case.

6. The power supply device for the electric vehicle according to claim 1,
wherein a lock device support stay is joined to the main frame for supporting the lock device, and
the lock device support stay has an extension part extended so as to be coupled to an upper portion of the battery pack cover.

7. The power supply device for the electric vehicle according to claim 3,
wherein the main frame of the electric vehicle has an under frame extending downwardly to the front side of the battery pack cover, and
a skid plate is attached to the under frame.

8. The power supply device for the electric vehicle according to claim 2, wherein a ring as a reinforcement member is fitted into an inner circumferential surface of the engagement hole.

9. A power supply device for an electric vehicle, comprising:
a battery case for accommodating battery cells for supplying electric power;
an extension of said battery case extending to above a battery cell accommodating portion;
a handle including a grip having an orientation extending in a vehicle longitudinal direction when the power supply device is mounted on the electric vehicle, said handle being mounted on the extension of the battery case;
a lock device attached to electric vehicle;
an engagement part for engagement with a movable part of the lock device, said engagement part being formed at either longitudinal-directionally side surfaces of the electric vehicle in relationship to the handle;
a motor case wherein the electric motor is accommodated, said motor case being supported on the main frame;
a terminal base, a male-side terminal coupled to a female-side terminal being disposed at a lower portion of the battery case and connected to the terminal base;
a battery pack cover provided with the terminal base at a lower portion thereof and having a space such that the battery case can be disposed at an upper portion of the terminal base; and
a battery pack support stay for connecting the battery cover to the motor case.

10. The power supply device for the electric vehicle according to claim 9, wherein the movable part of the lock device is a lock pin advanced and retracted in the longitudinal direction of the electric vehicle in relation to the lock device, and the engagement part is an engagement hole for accepting the lock pin.

11. The power supply device for the electric vehicle according to claim 9, wherein the electric vehicle includes:
a main frame being of a monocoque form that has an upwardly curved shape;
a pivot by which a front end of a swing arm is supported on the main frame;
said electric motor being disposed on a front side of the pivot in the longitudinal direction of the electric vehicle; and
a power drive unit disposed on a further front side of the electric motor;
said power supply device being disposed between the electric motor and the power drive unit.

12. The power supply device for the electric vehicle according to claim 11,
wherein the extension part is deviated toward either of the vehicle-width-directionally left and right sides in relation to the battery case in a condition where the battery case is mounted on the electric vehicle, and
at least an upper portion of the extension part extends to such a position so as to overlap, in side view of the vehicle, with that portion of the main frame which is located above the battery case.

13. The power supply device for the electric vehicle according to claim 9,
wherein a lock device support stay is joined to the main frame for supporting the lock device, and
the lock device support stay has an extension part extended so as to be coupled to an upper portion of the battery pack cover.

14. The power supply device for the electric vehicle according to claim 11,
wherein the main frame of the electric vehicle has an under frame extending downwardly to the front side of the battery pack cover, and
a skid plate is attached to the under frame.

15. The power supply device for the electric vehicle according to claim 10, wherein a ring as a reinforcement member is fitted into an inner circumferential surface of the engagement hole.

16. A power supply device for an electric vehicle, which comprises a battery case for accommodating battery cells for supplying electric power to an electric motor of an electric vehicle and which can be mounted to and detached from the electric vehicle, comprising:
an extension part of said battery case extending to above a battery cell accommodating part;
a handle provided on the extension part, said handle including a grip part having an orientation extending in a vehicle longitudinal direction when the power supply device is mounted on the electric vehicle;
an engagement part for engagement with a movable part of a lock device attached to the electric vehicle is formed at either of longitudinal-directionally side surfaces of the electric vehicle in relationship to the handle;
wherein the movable part of the lock device is a lock pin advanced and retracted in the longitudinal direction of the electric vehicle in relation to the lock device, and the engagement part is an engagement hole for accepting the lock pin; and
a ring as a reinforcement member is fitted into an inner circumferential surface of the engagement hole.

17. The power supply device for the electric vehicle according to claim 16, wherein the electric vehicle includes:
a main frame being of a monocoque form that has an upwardly curved shape;
a pivot by which a front end of a swing arm is supported on the main frame;
said electric motor being disposed on a front side of the pivot in the longitudinal direction of the electric vehicle; and
a power drive unit disposed on a further front side of the electric motor;
said power supply device being disposed between the electric motor and the power drive unit.

18. The power supply device for the electric vehicle according to claim 17,
wherein the extension part is deviated toward either of the vehicle-width-directionally left and right sides in relation to the battery case in a condition where the battery case is mounted on the electric vehicle, and at least an upper portion of the extension part extends to such a position so as to overlap, in side view of the vehicle, with that portion of the main frame which is located above the battery case.

19. The power supply device for the electric vehicle according to claim 16, wherein a lock device support stay is joined to the main frame for supporting the lock device, and the lock device support stay has an extension part extended so as to be coupled to an upper portion of the battery pack cover.

20. The power supply device for the electric vehicle according to claim 17, wherein the main frame of the electric vehicle has an under frame extending downwardly to the front side of the battery pack cover, and a skid plate is attached to the under frame.

* * * * *